(12) United States Patent
Ogasawara et al.

(10) Patent No.: US 7,043,604 B2
(45) Date of Patent: May 9, 2006

(54) DISK ARRAY SYSTEM

(75) Inventors: Hiroshi Ogasawara, Odawara (JP); Homare Kanie, Yokohama (JP); Nobuyuki Saika, Yokosuka (JP); Yutaka Takata, Ninomiya (JP); Shinichi Nakayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 10/806,128

(22) Filed: Mar. 23, 2004

(65) Prior Publication Data

US 2005/0114615 A1    May 26, 2005

(30) Foreign Application Priority Data

Nov. 26, 2003    (JP)    ............... 2003-394922

(51) Int. Cl.
*G06F 12/16*    (2006.01)
(52) U.S. Cl. .............. 711/114; 711/112; 711/162; 711/111
(58) Field of Classification Search .............. 711/162, 711/114, 113, 111, 112
See application file for complete search history.

(56) References Cited

U.S. PATENT DOCUMENTS

| 5,077,736 | A | * | 12/1991 | Dunphy et al. ............... 714/7 |
| 5,155,835 | A | * | 10/1992 | Belsan ..................... 711/114 |
| 5,568,628 | A | * | 10/1996 | Satoh et al. ............... 711/113 |
| 5,884,098 | A | | 3/1999 | Mason, Jr. |
| 6,081,883 | A | | 6/2000 | Popelka et al. |
| 6,115,797 | A | * | 9/2000 | Kanda et al. ............... 711/147 |
| 6,237,046 | B1 | * | 5/2001 | Ohmura et al. ............... 710/1 |
| 6,385,681 | B1 | * | 5/2002 | Fujimoto et al. ........... 710/316 |
| 6,763,409 | B1 | * | 7/2004 | Elliott ........................ 710/74 |
| 2002/0124124 | A1 | | 9/2002 | Matsumoto et al. |
| 2002/0152339 | A1 | * | 10/2002 | Yamamoto .................. 710/36 |
| 2002/0178143 | A1 | | 11/2002 | Fujimoto |
| 2003/0191904 | A1 | | 10/2003 | Iwami et al. |
| 2003/0204580 | A1 | | 10/2003 | Baldwin et al. |
| 2003/0212859 | A1 | | 11/2003 | Ellis et al. |
| 2004/0128456 | A1 | | 7/2004 | Kobayashi et al. |
| 2004/0148329 | A1 | | 7/2004 | Ogasawara et al. |
| 2004/0267959 | A1 | * | 12/2004 | Cochran et al. ............ 709/239 |

* cited by examiner

*Primary Examiner*—Pierre Bataille
*Assistant Examiner*—Sheng-Jen Tsai
(74) *Attorney, Agent, or Firm*—Reed Smith LLP; Stanley P. Fisher, Esq.; Juan Carlos A. Marquez, Esq.

(57) ABSTRACT

A disk array system includes storage devices, a storage device control unit, a connection unit being connected with the storage device control unit, channel control units, a shared memory, and a cache memory. Each channel control unit includes a first processor of converting file data, received through a local area network outside of the disk array system to which the channel control units belongs, into block data and requesting storage of the converted data in the plurality of storage devices and a second processor of transferring the block data to the storage devices through the connection unit and the storage device control unit in response to a request given from the first processor and is connected with the connection unit and the local area network.

12 Claims, 16 Drawing Sheets

162a  PHYSICAL DISK MANAGEMENT TABLE

| DISK NUMBER | VOLUME | RAID | USING STATE |
|---|---|---|---|
| #001 | 100GB | 5 | USED |
| #002 | 100GB | 5 | USED |
| #003 | 100GB | 5 | USED |
| #004 | 100GB | 5 | USED |
| #005 | 100GB | 5 | USED |
| #006 | 50GB | – | NOT USED |
| ⋮ | ⋮ | ⋮ | ⋮ |

162b  LU MANAGEMENT TABLE

| LU NUMBER | PHYSICAL DISK | VOLUME | RAID |
|---|---|---|---|
| #1 | #001,#002,#003,#004,#005 | 100GB | 5 |
| #2 | #001,#002,#003,#004,#005 | 300GB | 5 |
| #3 | #006,#007 | 200GB | 1 |
| ⋮ | ⋮ | ⋮ | ⋮ |

FIG. 9

730 METADATA

| FILE NAME | HEAD ADDRESS | VOLUME | OWNER | UPDATE TIME |
|---|---|---|---|---|
| A | 7BSA | 200MB | X | 0:00 |
| B | 05BF | 50MB | X | 7:57 |
| C | 1F30 | 100MB | Y | 9:15 |
| D | 470B | 100MB | Z | 15:20 |
| ⋮ | ⋮ | ⋮ | ⋮ | ⋮ |

FIG. 10A

721 FILE LOCK TABLE

| FILE NAME | LOCKING STATE |
|---|---|
| A | LOCKED |
| B | – |
| C | – |
| D | LOCKED |
| ⋮ | ⋮ |

FIG. 10B

722 LU LOCK TABLE

| LU | LOCKING STATE |
|---|---|
| SHARED | – |
| 1 | LOCKED |
| 2 | – |
| ⋮ | ⋮ |

FIG. 17

| SEQUENCE NUMBER | OPERATING SYSTEM (CHN1) | I/O PROCESSOR (CHN1) | OPERATING SYSTEM (CHN5) | I/O PROCESSOR (CHN5) | MANAGEMENT TERMINAL | SHARED LU | SHARED LU BACKUP | EXTERNAL BACKUP DEVICE (TAPE, ANOTHER STORAGE DEVICE) |
|---|---|---|---|---|---|---|---|---|
| 1 | | | | | INDICATE TO INITIALIZE SHARED LU ON LOGICAL LEVEL | | | |
| 2 | | | | | | INITIALIZE SHARED LU ON LOGICAL LEVEL | | |
| 3 | | | | | INDICATE TO INITIALIZE SHARED LU BACKUP LOGICAL LEVEL | | | |
| 4 | | | | | | | INITIALIZE SHARED LU BACKUP ON LOGICAL LEVEL | |
| 5 | | | | | INDICATE TO DEFINE PATH TO SHARED LU | | | |
| 6 | | DEFINE PATH TO SHARED LU | | DEFINE PATH TO SHARED LU | | | | |
| 7 | | | | | INDICATE TO DEFINE PATH TO SHARED LU BACKUP | | | |
| 8 | | DEFINE PATH TO SHARED LU BACKUP | | DEFINE PATH TO SHARED LU BACKUP | | | | |
| 9 | | | | | INDICATE TO INSTALL OPERATING SYSTEM TO CHN1 THROUGH NETWORK | | | |
| 10 | START INSTALL OF OPERATING SYSTEM THROUGH NETWORK | | | | | | | |
| 11 | INITIALIZE SHARED LU ON OPERATING SYSTEM LEVEL AND CREATE PARTITIONS FOR ALL CHNS | | | | | | | |
| 12 | | | | | | INITIALIZE SHARED LU ON OPERATING SYSTEM LEVEL AND CREATE PARTITIONS FOR ALL CHNS | | |
| 13 | INITIALIZE SHARED LU BACKUP ON OPERATING SYSTEM LEVEL AND CREATE PARTITIONS FOR ALL CHNS | | | | | | | |
| 14 | | | | | | | INITIALIZE SHARED LU ON OPERATING SYSTEM LEVEL AND CREATE PARTITIONS FOR ALL CHNS | |
| 15 | CREATE FILE SYSTEM ON SHARED LU | | | | | | | |
| 16 | | | | | | CREATE FILE SYSTEM TO BE SHARED BY CHN1 AND CHN5 | | |
| 17 | CREATE FILE SYSTEM ON SHARED LU BACKUP | | | | | | | |
| 18 | | | | | | | CREATE FILE SYSTEM TO BE SHARED BY CHN1 AND CHN5 | |
| 19 | NOTIFY COMPLETION OF INSTALL OF OPERATING SYSTEM THROUGH NETWORK | | | | | | | |
| 20 | | | | | NOTICE OF COMPLETION OF INSTALL OF OPERATING SYSTEM THROUGH NETWORK IS RECEIVED | | | |
| 21 | | | | | INDICATE TO INSTALL OPERATING SYSTEM IN CHN5 THROUGH NETWORK | | | |
| 22 | | | | START INSTALL OF OPERATING SYSTEM THROUGH NETWORK | | | | |
| 23 | | | | NOTIFY COMPLETION OF INSTALL OF OPERATING SYSTEM THROUGH NETWORK | | | | |
| 24 | | | | | NOTICE OF COMPLETION OF INSTALL OF OPERATING SYSTEM THROUGH NETWORK IS RECEIVED | | | |

FIG. 18

| SEQUENCE NUMBER | OPERATING SYSTEM (CH1) | I/O PROCESSOR (CHN1) | OPERATING SYSTEM (CHN5) | I/O PROCESSOR (CHN5) | MANAGEMENT TERMINAL | SHARED LU | SHARED LU BACKUP | EXTERNAL BACKUP DEVICE (TAPE, ANOTHER STORAGE DEVICE) |
|---|---|---|---|---|---|---|---|---|
| 1 | | | START NORMAL PROCESS | | | | | |
| 2 | MOUNT FILE SYSTEM OF SHARED LU | | | | | | | |
| 3 | MOUNT OF FILE SYSTEM OF SHARED LU IS COMPLETED | | | | | | | |
| 4 | START NORMAL PROCESS | | | | | | | |
| 5 | WRITE CLIENT INFORMATION, USER INFORMATION, SERVICE OPERATING INFORMATION, AND DAEMON OPERATING INFORMATION IN SHARED LU | | | | | | | |
| 6 | | | MONITOR OPERATING STATE OF CHN1 | | | | | |
| 7 | WRITE CLIENT INFORMATION, USER INFORMATION, SERVICE OPERATION INFORMATION, AND DAEMON OPERATION INFORMATION IN SHARED LU | | | | | | | |
| 8 | | | MONITOR OPERATING STATE OF CHN1 | | | | | |
| 9 | WRITE CLIENT INFORMATION, USER INFORMATION, SERVICE OPERATION INFORMATION, AND DAEMON OPERATION INFORMATION IN SHARED LU | | | | | | | |
| 10 | FAILURE TAKES PLACE IN CHN1 (SERVICE TO CLIENT IS INTERRUPTED) | | | | | | | |
| 11 | | | MONITOR OPERATING STATE OF CHN1 | | | | | |
| 12 | | | OCCURRENCE OF FAILURE IN CHN1 IS DETECTED | | | | | |
| 13 | | | MOUNT FILE SYSTEM IN SHARED LU | | | | | |
| 14 | | | MOUNT OF FILE SYSTEM IN SHARED LU IS COMPLETED | | | | | |
| 15 | | | START OPERATION WITH CLIENT INFORMATION, USER INFORMATION, SERVICE OPERATION INFORMATION, AND DAEMON OPERATION INFORMATION OF SHARED LU AND START SERVICE TO CLIENT | | | | | |

FIG. 19

| SEQUENCE NUMBER | OPERATING SYSTEM (CHN1) | I/O PROCESSOR (CHN1) | OPERATING SYSTEM (CHN5) | I/O PROCESSOR (CHN5) | MANAGEMENT TERMINAL | SHARED LU | SHARED LU BACKUP | EXTERNAL BACKUP DEVICE (TAPE, ANOTHER STORAGE DEVICE) |
|---|---|---|---|---|---|---|---|---|
| 1 | | | START NORMAL PROCESS | | | | | |
| 2 | MOUNT FILE SYSTEM OF SHARED LU | | | | | | | |
| 3 | MOUNT OF FILE SYSTEM OF SHARED LU IS COMPLETED | | | | | | | |
| 4 | START NORMAL PROCESS | | | | | | | |
| 5 | WRITE CLIENT INFORMATION, USER INFORMATION, SERVICE OPERATION INFORMATION, AND DAEMON OPERATION INFORMATION IN SHARED LU | | | | | | | |
| 6 | | | MONITOR OPERATING STATE OF CHN1 | | | | | |
| 7 | WRITE CLIENT INFORMATION, USER INFORMATION, SERVICE OPERATION INFORMATION, AND DAEMON OPERATION INFORMATION IN SHARED LU | | | | | | | |
| 8 | BACK UP SHARED LU PARTITIONS FOR CHN1 AND CHN5 WITH COPY COMMAND OF OS | | | | | | | |
| 9 | | | | | | COPY AREAS OF CHN1 AND CHN5 OF SHARED LU | | |
| 10 | | | | | | | AREAS OF CHN1 AND CHN5 OF SHARED LU ARE COPIED | |
| 11 | BACK UP SHARED LU PARTITIONS FOR CHN1 AND CHN5 TO TAPE DRIVE THROUGH SAN WITH NDMP PROTOCOL | | | | | | | |
| 12 | | | | | | BACK UP AREAS FOR CHN1 AND CHN5 OF SHARED LU | | |
| 13 | | | | | | | | AREAS FOR CHN1 AND CHN5 OF THE SHARED LU ARE BACKED UP |
| 14 | | | | | | SHARED LU IS DISABLED BY FAILURE | | |
| 15 | FAILURE TAKES PLACE IN CHN (SERVICE TO CLIENT IS INTERRUPTED) | | | | | | | |
| 16 | | | MONITOR OPERATING STATE OF CHN1 | | | | | |
| 17 | | | OCCURRENCE OF FAILURE IN CHN1 IS DETECTED | | | | | |
| 18 | | | INDICATE TO MOUNT FILE SYSTEM OF SHARED LU | | | | | |
| 19 | | | MOUNT OF FILE SYSTEM OF BACKUP OF SHARED LU IS FAILED | | | | | |
| 20 | | | INDICATE TO MOUNT FILE SYSTEM OF BACKUP OF SHARED LU | | | | | |
| 21 | | | MOUNT OF FILE SYSTEM OF BACKUP OF SHARED LU IS COMPLETED | | | | | |
| 22 | | | START OPERATION WITH CLIENT INFORMATION, USER INFORMATION, SERVICE OPERATION INFORMATION, AND DAEMON OPERATION INFORMATION OF BACKUP OF SHARED LU OF BACKUP OF SHARED LU, AND START SERVICE TO CLIENT | | | | | |

DISK ARRAY SYSTEM

BACKGROUND OF THE INVENTION

The present invention relates to a novel storage device system which is arranged to connect with a plurality of different kinds of networks. More particularly, the invention relates to the method of controlling a duplication of the storage device system.

Today, the amount of data to be processed by a computer system is abruptly on the rise. In order to efficiently use and manage such a massive amount of data, a new technology has been developed in which a plurality of disk array devices (referred to as a storage device system) is connected with an information processing apparatus through a leased network (Storage Area Network abbreviated as SAN) so that a fast and great deal of accesses to the storage device system may be implemented. For connecting the storage device system with the information processing apparatus through the SAN and realizing a fast data transfer, in general, a network is configured through the use of communication equipment arranged according to a fiber channel protocol.

On the other hand, the network system called the NAS (Network Attached Storage) has been developed. The NAS is arranged to connect a plurality of storage device systems with the information processing apparatus through the network configured according to the TCP/IP (Transmission Control Protocol/Internet Protocol) so that the access to the storage device system may be realized on the file basis. In the NAS, the device having a file-system function is connected with the storage device system, so that the information processing apparatus may access to the storage device system on the file basis. In particular, today, a remark is focused on a large-scaled NAS in which a file system is coupled with the storage device system managed in a RAI (Redundant Arrays of Inexpensive Disks) for providing a gigantic storage resource called a mid-range class or an enterprise class one.

The conventional NAS, however, is realized by connecting the storage device system having no TCP/IP communication function and no file-system function with the information processing apparatus having the TCP/IP communication function and the file-system function. This thus requires an additional area where the information processing apparatus to be connected therewith is installed. Further, since the information processing apparatus is connected with the storage device system through the SAN because the communications need to be fast, it has been necessary to install the communication control equipment and function dedicated for the purpose.

The present invention is made in consideration of the foregoing shortcomings. It is a main object of the present invention to provide a storage device system newly invented to be connected with a plurality of different kinds of networks, a storage device control device required to invent such a storage device system, and a method of controlling a duplication of the device control device.

SUMMARY OF THE INVENTION

The disk array system according to the present invention includes the following components.

The disk array system includes a plurality of storage devices for storing data, a storage device control unit for controlling storage of data in the plurality of storage devices, a connection unit to be connected with the storage device control unit, a plurality of first channel control units, a shared memory for storing control information to be transferred between the plurality of first channel control units and the storage device control unit, and a cache memory for temporarily saving data to be transferred between the plurality of first channel control units and the storage device control unit.

The first channel control unit includes a first process for converting data on the file basis (referred simply to as file data), received through a local area network located outside the disk array system to which the control unit belongs, into data on the block basis (referred simply to as block data) and requiring storage of the data into the plurality of storage devices and a second processor for transferring the block data to the plurality of storage devices through the connection unit and the storage device control unit according to the request given from the first processor. The first channel control unit is connected with the connection unit and the local area network.

The second processor located in each of the first channel control units creates a plurality of storage areas for storing the block data and a processor information saving area in which the information about the inter-processor processing status to be transferred among the plurality of first processors by using the storage area of each of the plurality of storage devices.

The storage device control unit controls a duplication of the information saved in the processor information saving area into a saving area for backing up the processor information created by using each storage area of the storage devices in accordance with an indication given from the first processor located inside each of the first channel control units.

In the disk array system according to the present invention, the first processor located inside each of the first channel control units instructs the second processor located inside the first channel control unit where the first processor is installed to store the information about the processing status of the first processor in the processor information storage area. In this case, the second processor located inside the first channel control unit where the first processor is installed controls storage of the information about the processing status of the first processor in the processor information storage area in response to an indication given from the first channel control unit.

In the disk array system according to the present invention, the second processor located inside each of the first channel control units stores the block data in the cache memory in response to a request given from the first processor located inside the first channel control unit where the second processor is installed and at once stores the information for representing the storage of the block data in the cache memory in the shared memory. In this case, the shared memory stores the information for representing the storage of the block data in the cache memory under the control of the second processor located inside each of the first channel control units.

Moreover, in the disk array system according to the present invention, the first processor located inside each of the first channel control units instructs the storage device control unit to copy the information stored in the processor information storage area to the storage area for backing up the processor information. In this case, the storage device control unit controls a copying process in response to an indication given from the first processor.

Further, in the disk array system according to the present invention, if the read or the write of the information from or to the processor information storage area is made possible, the first processor located inside each of the first channel control units may continue the process by reading or writing the information stored in the storage area for backing up the processor information.

In the disk array system according to the present invention, the plurality of first channel control units are classified into a plurality of cluster groups. The processor information storage area includes a plurality of processor information storage portions. The processor information storage portions are allocated to the cluster groups, respectively.

In the disk array system according to the present invention, the plurality of first channel control units included in the first one of the cluster groups store the information about the inter-processor processing status to be transferred by the first processor in the first one of the plurality of processor information storage portions. In this case, the plurality of first channel control units included in the second one of the cluster groups store the information about the inter-processor processing status to be transferred by the first processor in the second one of the plurality of processor information storage portions.

In the disk array system according to the present invention, the first processor of each of the first channel control units included in the first cluster group instructs the storage device control unit to duplicate the information stored in the first processor information storage portion. In this case, the storage device control unit stores a duplication of the information stored in the first processor information storage portion in the first backup area included in the storage area for backing up the processor information in response to an indication given from the first processor of the first channel control units included in the first cluster group.

In the disk array system according to the present invention, the first processor of each of the first channel control units included in the first cluster group instructs the storage device control unit to duplicate the information stored in the first processor information storage portion and the second processor information storage portion. In this case, the storage device control unit stores a duplication of the information stored in the first processor information storage portion and the second processor information storage portion in the first backup area and the second backup area included in the storage area for backing up the processor information in response to an indication given from the first processor of the first channel control units included in the first cluster group.

The disk array system according to the present invention includes a management terminal used for obtaining the information about the first channel control units and the storage device control units. In this case, the storage device control unit stores a duplication of the information stored in the first processor information storage portion and the second processor information storage portion in the first backup area and the second backup area included in the storage area for backing up the processor information in response to an indication given from the management terminal.

In the disk array system according to the present invention, if the read or the write of the information stored in the first processor information storage portion is disabled, the first processor of the first channel control units included in the first cluster group continues the process by reading or writing the information stored in the first backup area.

Further, the disk array system according to the present invention includes the following components.

The disk array system includes a plurality of storage devices for storing data, a storage device control unit for controlling a storage of the data in the storage devices, a connection unit being connected with the storage device control unit, a plurality of first channel control units, a shared memory for storing control information to be transferred between the first channel control units and the storage device control unit, and a cache memory for temporarily storing data to be transferred between the first channel control units and the storage device.

Each of the first channel control units includes a first processor for converting file data, received through a local area network outside the disk array system to which the first processor belongs, into block data and requesting a storage of the data in the plurality of storage devices and a second processor for transferring the block data into the plurality of storage devices through the connection unit and the storage device control unit in response to a request given from the first processor. The plurality of first channel control units are connected with the connection unit and the local area network.

The second processor located inside each of the first channel control units creates a plurality of storage areas where the block data is stored, a processor information storage area where the information about the inter-processor processing status to be transferred by the first processors, and a software program storage area for storing a software program run on the first processors through the use of the storage areas of the storage devices.

The first processor located inside each of the first channel control units obtains the software program stored in the software program storage area under the control of the second processor located inside the first channel control unit where the first processor is installed. Then, the first processor is operated according to the obtained software program.

In the disk array system according to the present invention, the software program operated in the first processor located inside each of the first channel control units instructs the storage device control unit to copy the information stored in the processor information storage area to the storage area for backing up the processor information. In this case, the storage device control unit controls a duplicate of the information stored in the processor information storage area in the processor information backup storage area created by the storage areas of the plurality of storage devices in response to an indication given from the first processor located inside each of the first channel control unit.

Moreover, in the disk array system according to the present invention, the plurality of first channel control units are classified into a plurality of cluster groups. The processor information storage area includes a plurality of processor information storage portions. The software programs operated in the plurality of first channel control units included in the first one of the plurality of cluster groups are operated cooperatively to store the information about the inter-processor processing status in the first one of the plurality of processor information storage portions.

In the disk array system according to the present invention, for each of the cluster groups, the information stored in the plurality of processor information storage portions is duplicated in the plurality of backup areas corresponding with the plurality of processor information storage portions.

In the disk array system according to the present invention, the first processor located inside each of the plurality of first channel control units included in the first one of the cluster groups instructs the storage device control unit to execute a duplication of the data block by block. In this case, in response to an indication given from the first processor, the storage device control unit duplicates the information stored in the first processor into the first one of the plurality of backup areas block by block.

In the disk array system according to the present invention, the local area network provides a terminal. In this case, the first processor located inside each of the plurality of first channel control units included in the first one of the plurality of cluster groups instructs the storage device control unit to execute the block-by-block duplication through the second processor located inside the first channel control unit where the first processor is installed.

Moreover, in the disk array system according to the present invention, the first processor located inside the plurality of first channel control units included in the first one of the cluster groups instructs the storage device control unit to execute the block-by-block duplication through the second processor located inside the first channel control unit where the first processor is installed. This duplication is executed at regular intervals.

Further, in the disk array system according to the present invention, the first processor located inside the plurality of first channel control units included in the first one of the cluster groups obtains a load state of the storage device control unit through the second processor located inside the first channel control unit where the first processor is installed and instructs the storage device control unit to execute the block-by-block duplication according to the load state of the storage device control unit.

Further, in the disk array system according to the present invention, if the access to the information stored in the first one of the plurality of processor information storage portions is disabled, the first processor located inside the plurality of first channel control units included in the first one of the cluster groups executes the process through the use of the information stored in the first backup area. In the case of newly forming the first processor information storage portion, the first processor duplicates the information stored in the first backup area in the newly formed first processor storage portion and then executes the process through the use of the information stored in the newly formed first processor information storage portion.

The present invention may provide the storage device system that is newly invented to connect a plurality of different kinds of networks. Further, the present invention may also provide the method of controlling a duplication of a system area of the storage device control device required for inventing such a storage device system.

BRIEF DESCRIPTION OF THE DRAWINGS

FIG. 2 is a block diagram showing a configuration of a management terminal according to an embodiment of the present invention;

FIG. 9 is a view showing metadata according to an embodiment of the present invention;

FIGS. 10A and 10B are views showing lock data according to an embodiment of the present invention;

FIG. 17 is a chart showing a procedure of initializing and partitioning the shared LU according to the embodiment of the present invention;

FIG. 18 is a chart showing a fail-over procedure of the CHN to be executed through the use of the information stored in the shared LU according to the embodiment; and FIG. 19 is a chart showing a procedure of backing up the shared LU according to this embodiment and a fail-over procedure of the CHN through the use of the information for backing up the shared LU if the shared LU is disabled.

DESCRIPTION OF THE EMBODIMENTS

Hereafter, the embodiments of the present invention will be described with reference to the drawings.

Figure 1:
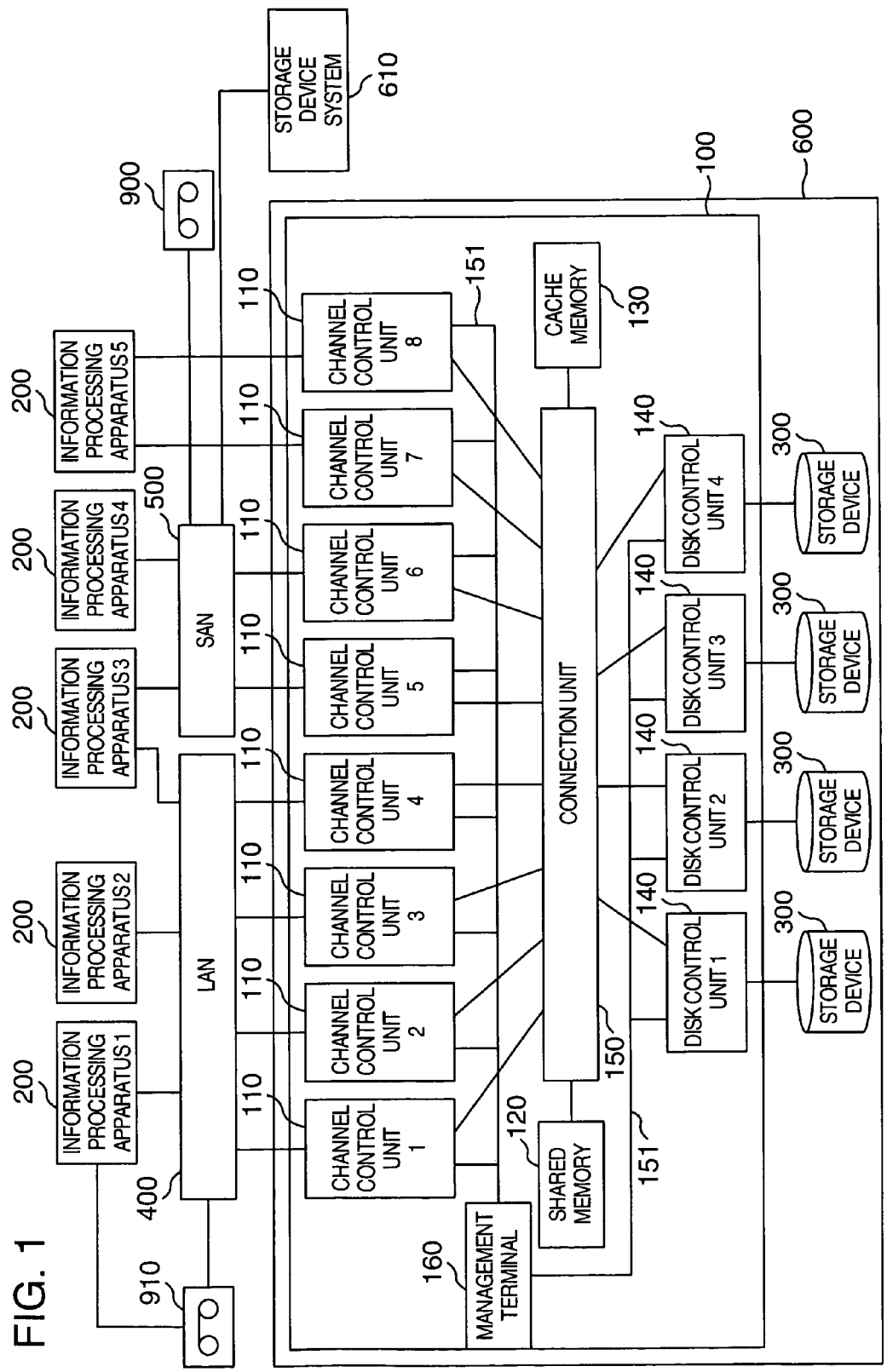
FIG. 1 is a block diagram showing an overall configuration of a storage device system according to an embodiment of the present invention.

FIG. 1 is a block diagram showing an overall configuration of the storage device system according to an embodiment of the present invention.

(Exemplary Configuration)

The storage device system 600 provides a storage device control device 100 and a storage device 300. The storage device control device 100 controls the storage device in response to a command received from an information processing apparatus 200. For example, in receipt of an I/O request of data from the information processing apparatus 200, the storage device control device 100 performs a process of inputting and outputting data stored in the storage device 300. The data is stored in a logical unit (referred to as an LU) that corresponds to a storage area logically specified on a physical storage area provided by a disk drive equipped in the storage device 300. Further, the storage device control device 100 also transfers various kinds of commands used for managing the storage device system 600 with the information processing apparatus 200.

The information processing apparatus 200 is a computer equipped with a CPU (Central Processing Unit) and a memory. The CPU provided in the information processing apparatus 200 executes various kinds of programs according to which various functions are realized. The information processing apparatus 200 may be a personal computer, a workstation, or a mainframe.

In FIG. 1, the information processing apparatuses 1 to 3 (200) are connected with a storage device control device 100 through a LAN (Local Area Network) 400. The LAN 400 may be the Internet or a leased network. The information processing apparatuses 1 to 3 (200) are communicated with the storage device control device 100 according to, for example, the TCP/IP protocol. The communication is executed through the LAN 400. The information processing apparatuses 1 to 3 (200) transmit to the storage device system a data access request (a data I/O request on the file basis, which is referred to as a file access request) specified by a file name.

The LAN 400 is connected with a backup device 910. The backup device 910 is concretely a disk system device or a tape system device, the disk system device including a MO, a CD-R and a DVD-RAM and the tape system device including a DAT tape, a cassette tape, an open-reel tape and a cartridge tape. The backup device 910 stores the backup of the data stored in the storage device 300 by communicating with the storage device control device 100 through the LAN 400. Further, the backup device 910 is connected with the information processing apparatus 1 (200). In this case, the backup device 910 obtains the backup of the data stored in the storage device 300 through the information processing apparatus 1 (200).

The storage device control apparatus 100 provides a channel control units 1 to 4 (110). In the storage device control device 100, the channel control units 1 to 4 (110) are inputted with the file access requests from the information processing apparatuses 1 to 3 (200) through the LAN 400, respectively. That is, the channel control units 1 to 4 (110) have the network addresses (such as IP addresses) on the LAN 400 respectively allocated thereto. Hence, each channel control unit may be operated like a NAS. Each channel control unit may thus provide a service as the NAS to the information processing apparatuses 1 to 3 (200) in such a manner that each NAS is independent. Hereafter, the channel control units 1 to 4 (110) are referred to as CHNs. As mentioned above, one storage device system 600 is arranged to provide the channel control units 1 to 4 (110) each of which may supply its own service as the NAS. It means that the NAS servers operated by the corresponding computers are aggregated into one storage system 600. This makes it possible to systematically manage the storage device system 600, thereby making the maintenance such as various settings and controls, lifetime management, and version management more efficient.

Moreover, the channel control units 1 to 4 (110) of the storage device control device 100 according to this embodiment are realized by hardware formed on a unit circuit substrate and software such as an operating system (referred to as an OS) to be executed on this hardware, an application program to be operated on this OS, or an executable object code to be executed by this hardware. As described above, in the storage device system 600 according to this embodiment, the functions that have been conventionally mounted as part of hardware are realized by software. The storage device system 600 according to this embodiment thus makes the quite flexible system operation possible, thereby being able to supply more fine services in response to quite variable and flexible user needs.

The information processing apparatuses 3 to 4 (200) are connected with the storage device control device 100 through the SAN (Storage Area Network) 500. The SAN 500 is a network through which data is communicated between the information processing apparatuses 3 to 4 (200) and the storage device control device 100 in a block-by-block manner, the block being a management unit of the data stored in the storage area provided by the storage device 300. The communication between the information processing apparatuses 3 to 4 (200 and the storage device control device 100 to be executed through the SAN 500 generally follows the fiber channel protocol. The information processing apparatuses 3 to 4 transmit to the storage device system 600 a data access request on the block basis (referred to as a block access request).

The SAN 500 is connected with the corresponding backup device 900 therewith. The backup device 900 stores the backup of the data stored in the storage device 300 by communicating data with the storage device control device 100 through the SAN 500.

The storage device control device 5 (200) is connected with the storage device control device 100 without through the network such as the LAN 400 or the SAN 500. The information processing apparatus 5 (200) may be a mainframe, for example. The communication between the information processing apparatus 5 (200) and the storage device control device 100 follows the communication protocols such as FICON (Fibre Connection)(Trademark), ESCON (Enterprise System Connection)(Trademark), ACONARC (Advanced Connection Architecture) (Trademark), or FIBARC (Fibre Connection Architecture)(Trademark). The information processing apparatus 5 (200) transmits to the storage device system 600 the block access request according to the communication protocol.

The storage device control device 100 communicates data with the information processing apparatus 5 (200) through the effect of the channel control units 7 to 8 (110). Later, the channel control units 7 to 8 are referred to as CHAs.

The SAN 500 is connected with another storage device system 610 installed in a site (secondary site) that is remote from the site (primary site) where the storage device system 600 is installed. The storage device system 610 is used as a device to which data is duplicated when the duplication or remote copying function (to be discussed below) is executed. Further, the storage device system 610 may be connected with not only the SAN 500 but the storage device system 600 through a communication line such as an ATM. The channel control unit used for this case provides an interface (channel extender) used for the communication line.

(Storage Device)

The storage device 300 provides a lot of disk drives (physical disks) and supplies the information processing apparatus 200 with a storage area. The data is stored in the LU that is the storage area logically specified on the physical storage area supplied by the disk drive. The disk drive may be a harddisk unit, a flexible disk unit, a semiconductor device, or the like. Further, the storage device 300 may be arranged to compose a disk array from a plurality of disk drives, for example. In this case, the storage area to be supplied to the information processing apparatus 200 may be arranged to be supplied by a plurality of disk drives managed by the RAID.

The storage device control device 100 may be connected with the storage device 300 directly as shown in FIG. 1 or through the network. Further, the storage device 300 may be integrally combined with the storage device control device 100.

The LU set to the storage device 300 may be a user LU to be accessed by the information processing apparatus 200, a system LU to be used for controlling the channel control unit 110, or the like. In the system LU, the OS to be executed in the CHN 110 is stored as well. Further, each LU is matched to the channel control unit 110. This makes it possible to allocate the accessible LU to each channel control unit 110. This matching allows a plurality of channel control units 110 to share one LU. Hereafter, the user LU or the system LU may be referred to as a user disk or a system disk, respectively.

(Storage Device Control Device)

The storage device control device 100 is equipped with a channel control unit 110, a shared memory 120, a cache memory 130, a disk control unit 140, a management terminal 160, or a connection unit 150.

The channel control unit 110 provides a communication interface used for communicating data with the information processing apparatus and also has a function of transferring data I/O commands with the information processing apparatus 200. For example, the CHN 110 is inputted with a file access request from the information processing apparatuses 1 to 3 (200). This allows the storage device system 600 to supply the information processing apparatuses 1 to 3 (200) with the NAS service. Further, the CHF 110 accepts a block access request according to the fiber channel protocol given from the information processing apparatuses 3 to 4 (200). This also allows the storage device system 600 to supply the information processing apparatuses 3 to 4 (200) with the data storage service to be rapidly accessed. Further, the CHA 110 accepts the block access request from the information processing apparatus 5 (200) according to the protocol such as FICON, ESCON, ACONARC or FIBERC. This also allows the storage device system 600 to supply the mainframe like the information processing apparatus 5 (200) with the data storage service.

Each channel control unit 110 is connected with the management terminal 160 through the communication network like the internal LAN 151. This causes the management terminal 160 to transmit a micro program to be executed by the channel control unit 110 and then install the micro program into the channel control unit 110. The arrangement of the channel control unit 110 will be discussed below.

The connection unit 150 is connected with the channel control unit 110, the shared memory 120, the cache memory 130, and the disk control unit 140. The transfer of data and commands among the channel control unit 110, the shared memory 120, the cache memory 130, and the disk control unit 140 is executed through the connection unit 150. The connection unit 150 is composed of a switch or a bus such as a super fast cross-bus switch, which causes the fast switching to transmit the data. By connecting the channel control units 110 with each other through the switch, the performance of the communication between the channel control units 110 is greatly improved in comparison with the conventional arrangement in which the NAS servers operating on the corresponding computers are connected with each other through the LAN. Further, this makes it possible to implement a fast file sharing function or a fast fail-over function.

The shared memory 120 and the cache memory 130 are the storage memories shared by the channel control unit 110 and the disk control unit 140. The shared memory 120 is mainly used for storing control information and commands, while the cache memory 130 is mainly used for storing data.

For example, if the data I/O command received by a certain channel control unit 110 from the information processing apparatus 200 is a write command, the concerned channel control unit 110 writes the write command in the shared memory 120 and the writing data received from the information processing apparatus 200 in the cache memory 130. On the other hand, the disk control unit 140 monitors the shared memory 120. When the write of the write command in the shared memory 120 is detected, the write data is read out of the cache memory 130 and written in the storage device 300 in response to the write command.

For example, if the data I/O command received by a certain channel control unit 110 from the information processing apparatus 200 is a read command, the concerned channel control unit 110 writes the read command in the shared memory 120 and reads the data requested from the information processing apparatus 200 by the read command read out of the cache memory 130. If the data requested by the read command is not written in the cache memory 130, the channel control unit 110 or the disk control unit 140 reads the data requested by the read command read out of the storage device 300 and then writes the data in the cache memory 130.

The foregoing embodiment has been described so that the shared memory 120 and the cache memory 130 are provided independently of the channel control units 110 and the disk control units 140. However, the arrangement of this embodiment is not limited to the described one. For example, the shared memory 120 or the cache memory 130 may be separately provided in each of the channel control units 110 and the disk control units 140. In this case, the connection unit 150 has a role of connecting the channel control units 110 each of which provides the shared memory or the cache memory with the disk control units 140 each of which provides the shared memory or the cache memory.

The disk control unit 140 controls the storage device 300. For example, as mentioned above, the channel control unit 110 writes the data in the storage device 300 according to the data write command received from the information processing apparatus 200. Further, the data access request to the LU specified by the logical address transmitted by the channel control unit 110 is converted into the data access request to the physical disk specified by a physical address. If the physical disk in the storage device 300 is managed by the RAID, the data access is executed according to the RAID composition. Further, the disk control unit 140 controls duplication management or backup of the data stored in the storage device 300. Further, for the purpose of preventing data loss caused in a disaster (disaster recovery), the disk control unit 140 also has a duplication function or a remote copy function of controlling storage of a duplicate of the data in the storage device system 600 in the primary site in another storage device system 610 installed in the secondary site.

Each disk control unit 140 is connected with the management terminal 160 through a communication network such as the internal LAN 151 so that the communication therebetween may be made possible. This allows the management terminal 160 to transmit the micro program to be executed by the disk control unit 140 and then install the micro program into the disk control unit 140. The arrangement of the disk control unit 140 will be discussed below.

(Management Terminal)

The management terminal 160 is a computer dedicated for maintaining and managing the storage device system 600. By handling the management terminal 160, for example, it is possible to specify the physical disk composition in the storage device 300, specify the LU, install the micro program to be executed in the channel control unit 110, or the like. Herein, the specification of the physical disk composition in the storage device 300 includes increase or decrease of the physical disk, change of the RAID composition (change from RAID 1 to RAID 5), and the like. Further, the system manager causes the management terminal 160 to check the operating state of the storage device system 600, specify a failed portion of the system 600, install the OS to be executed in the channel control unit 110, and so forth. Moreover, the management terminal 160 is connected with an outside maintenance center through the LAN or the phone line. The system manager causes the management terminal 160 to monitor failure of the storage device system 600 or quickly cope with a failure if any. The occurrence of the failure is notified by the OS, the application program, the driver software, or the like. This notice is executed according to the HTTP protocol or the SNMP (Simple Network Management) protocol or by an electronic mail. These specification and control are executed by the system operator (manager) who handles as a user interface a Web page provided by a Web server operated on the management terminal 160. The operator handles the management terminal 160 for specifying a target portion or a content to be monitored or a destination to which failure is to be notified.

The management terminal 160 may be arranged to be contained in the storage device control device 100 or attached outside thereof. Further, the management terminal 160 may be a computer dedicated for maintaining or managing the storage device control device 100 and the storage device 300 or the general-purpose computer may be provided with the maintenance and management function.

As to the arrangement of the CHN 110 in the storage device system 600, the technique of the Japanese Patent Application No. 2003-111591, filed on Jan. 20, 2003, in Japan is incorporated herein by reference to support the descriptions.

As to the exclusive control on the file basis and on the LU basis in the storage device system 600, the technique of the Japanese Patent Application No. 2003-11593, filed on Jan. 20, 2003, in Japan is incorporated herein by reference to support the descriptions.

As to the data backup control in the storage device system 600, the technique of the Japanese Patent Application No. 2003-11594, filed on Jan. 20, 2003, in Japan is incorporated herein by reference to support the descriptions.

As to the control for installing the software in the storage device system 600, the technique of the Japanese Patent Application No. 2003-1595, filed on Jan. 20, 2003, in Japan is incorporated herein by reference to support the descriptions.

As to the power control on the CHN 110 in the storage device system 600, the technique of the Japanese Patent Application No. 2003-15525, filed on Jan. 24, 2003, in Japan is incorporated herein by reference to support the descriptions.

As to the control for failure information in the storage device system 600, the technique of the Japanese Patent Application No. 2003-302303, filed on August 27, in Japan is incorporated herein by reference to support the descriptions.

FIG. 2 is a block diagram showing an arrangement of the management terminal 160.

The management terminal 160 provides a CPU 161, a memory 162, a port 163, a recording medium reader 164, an input unit 165, an output unit 166, and a storage unit 168.

The CPU 161 totally controls the management terminal 160 and realizes the function as the Web server by executing the program 162c stored in the memory 162. The memory 162 stores a physical disk management table 162a, an LU management table 162b, and a program 162c.

Figures 3, 4:
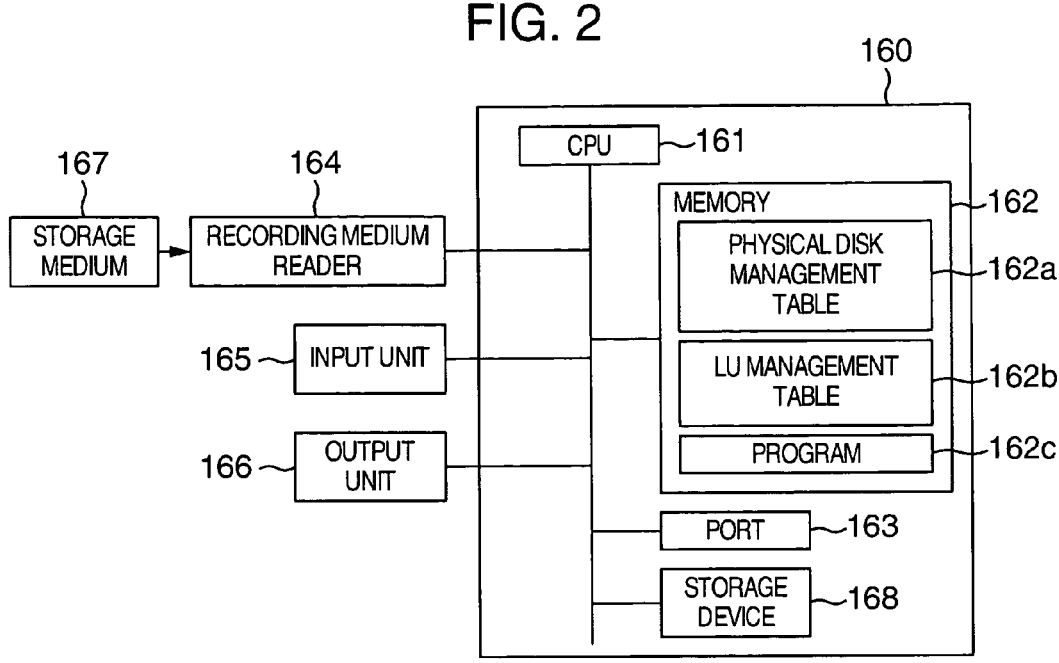
FIG. 3 is a view showing a physical disk management table according to an embodiment of the present invention.
FIG. 4 is a view showing an LU management table according to an embodiment of the present invention.

The physical disk management table 162a is a table used for managing a physical disk (disk drive) provided in the storage device 300. The physical disk management table 162a is shown in FIG. 3. In FIG. 3, of lots of physical disks provided in the storage device 300, the physical disks of disk Nos.#001 to #006 are shown. For each physical disk, a volume, a RAID composition, and a using status are shown.

The LU management table 162b is a table used for managing the LU logically specified on the physical disk. The LU management table 162b is shown in FIG. 4. In FIG. 4, of lots of LUs specified on the storage device 300, the LUs of LU Nos. #1 to #3 are shown, For each LU, a physical disk number, a volume, and a RAID composition are shown.

The storage medium reader 164 is a device for reading a program or data stored on the recording medium 167. The read program or data is stored in the memory 162 or the storage unit 168. Hence, the program 162c recorded on the recording medium 167 is read from the recording medium 167 through the reader 164 and then is stored in the memory 162 or the storage unit 168. The recording medium 167 may be a flexible disk, a CD-ROM, a semiconductor memory, or the like. The recording medium reader 162 may be built in the management terminal 160 itself. The storage unit 168 may be a harddisk unit, a flexible disk unit, a semiconductor storage unit, or the like. The input unit 165 may be a keyboard or a mouse. The output unit 166 is a device used for outputting information. The output unit 166 may be a display or a printer. The port 163 is connected with an internal LAN 151 through which the management terminal 160 may communicate with the channel control unit 110 or the disk control unit. Further, the port 163 may be connected with the LAN 400 or the phone line.

(Appearance View)

Figure 5:
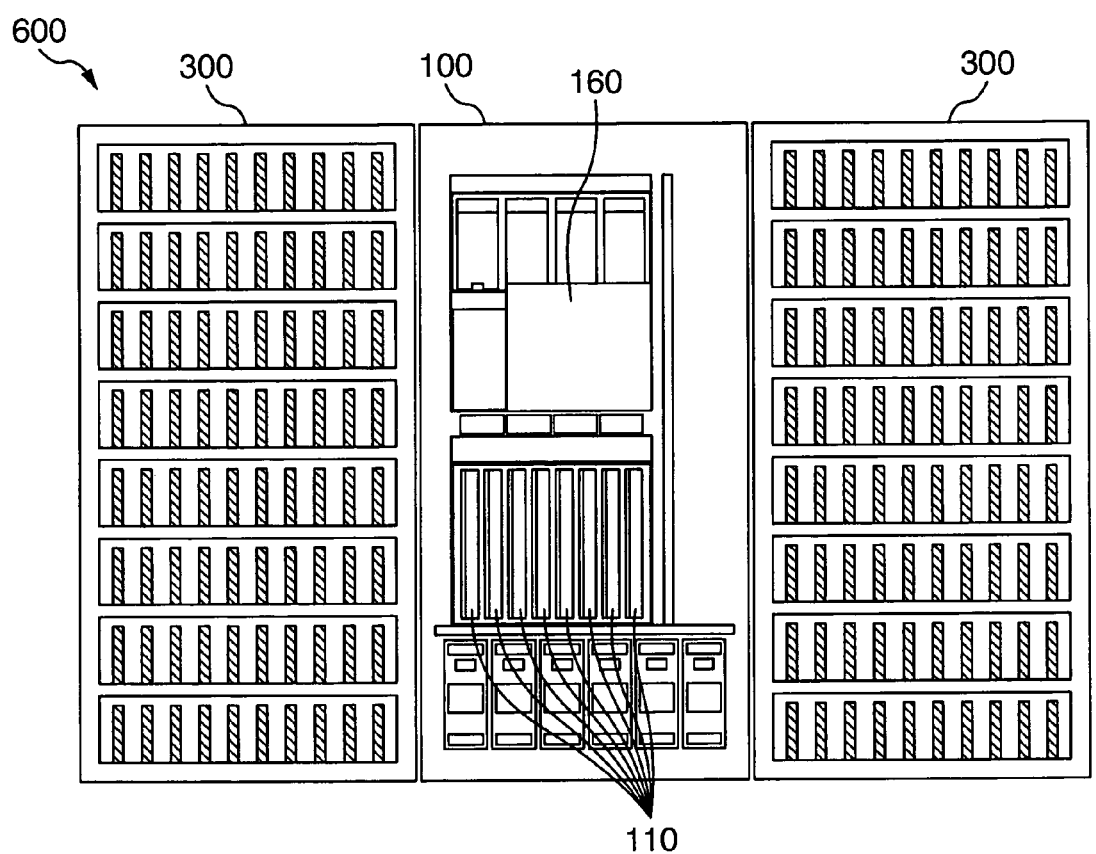
FIG. 5 is a view showing an outer appearance of the storage device system according to an embodiment of the present invention.
Figure 6:
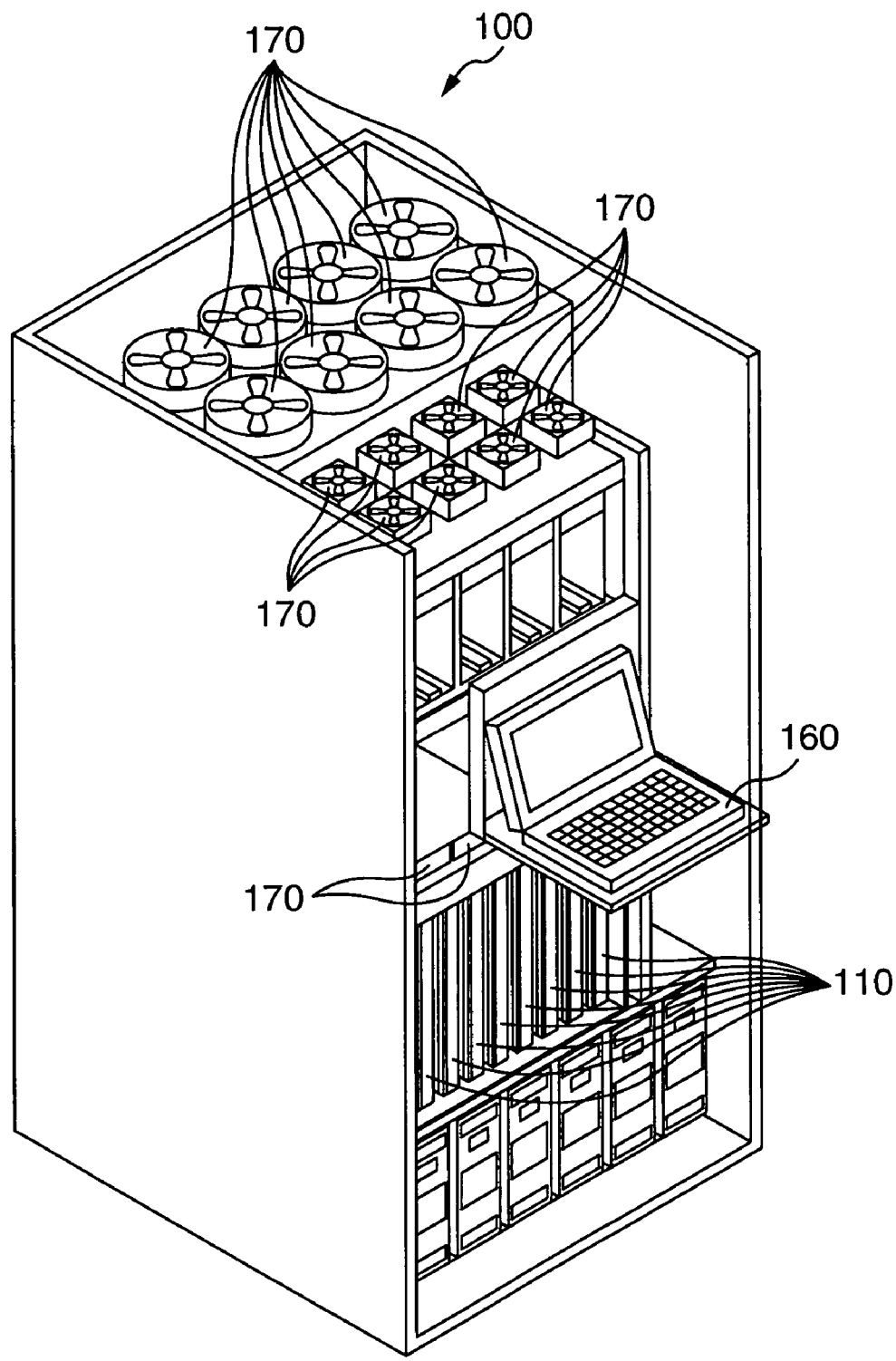
FIG. 6 is a view showing an outer appearance of a storage device control device according to an embodiment of the present invention.

Then, the appearance of the storage device system 600 according to this embodiment is illustrated in FIG. 5. Further, the appearance of the storage device control device is illustrated in FIG. 6.

As shown in FIG. 5, the storage device system 600 according to this embodiment is configured so that the storage device control device 100 and the storage device 300 are housed in their own boxes. The box of the storage device 300 is located on each side of the box of the storage device control device 100.

The storage device control device 100 provides the management terminal 160 on the front central portion. The management terminal 160 is shielded with a cover. As shown in FIG. 6, when the management terminal 160 is used, the cover is opened by an operator. Moreover, the management terminal 160 shown in FIG. 6 is a so-called notesized personal computer. It may take any form.

In the lower portion of the management terminal 160, a slot is provided for mounting the channel control unit 110. The board of the channel control unit 110 is fitted to each slot. In the storage device system 600 according to this embodiment, for example, eight slots are provided. In FIGS. 5 and 6, a guide rail is mounted for fitting the channel control unit 110 to the eight slots. By inserting the channel control units 110 into the slots along the guide rail, the channel control unit 110 may be mounted to the storage device control unit 100. Further, the channel control unit 110 mounted to each slot may be removed by pulling it toward the system operator or someone along the guide rail. Further, in the front portion of each slot in the back direction, a connector is provided for electrically connecting each channel control unit 110 with the storage device control unit 100.

The channel control unit 110 may be CHN, CHF or CHA. The channel control units 110 are compatible in size, connection position, connector pin array or the like with each other. Hence, any channel control device 110 may be mounted to eight slots. Hence, the CHN 110 may be mounted to all eight slots. Further, as shown in FIG. 1, four CHNs 110, two CHFs 110, and two CHAs 110 may be mounted to the eight slots. Any slot may be empty.

As stated above, the channel control unit 110 may be supplied as a board to be mounted to each slot, that is, one integral unit. The same unit may be composed of a plurality of boards. That is, if the channel control unit 110 may be composed of a plurality of boards or one integral unit composed by connecting the boards with each other and may be integrally mounted to the slot of the storage device control device 100, the channel control unit 110 may be considered as the concept of the same circuit board.

The other devices composing the storage device control device 100, such as the disk control unit or the shared memory 120, are not shown in FIGS. 5 and 6. However, those components are mounted on the back side of the storage device control device 100.

Further, the storage device control device 100 is equipped with a fan 170 for dissipating heat generated from the channel control unit 110. The fan 170 is located on the top of the storage device control device 100 and the top of the slot for the channel control unit 110.

As the storage device control device 100 and the storage device 300 housed in their boxes, the conventional device made commercially available as the SAN product may be used. In particular, as noted above, by forming the CHN connector to be fitted into the slot formed in the conventional box, it is possible to make easier use of the conventionally constructed device. That is, the storage device system 600 of this embodiment may be easily built by using the existing product.

Further, according to this embodiment, by randomly mounting the CHN 110, the CHF 110, and the CHA 110 to the storage device system 600, it is possible to realize the storage device system to be connected with a different kind of network. Concretely, the storage device system 600 is a SAN-NAS integrated storage device system in which the system 600 is connected with the LAN 140 through the CHN 110 and with the SAN 500 through the CHF 110.

(Channel Control Unit)

The storage device system 600 according to this embodiment causes the CHN 110 to accept the file access requests from the information processing apparatuses 1 to 3 (200) and supply a NAS service to the information processing apparatuses 1 to 3 (200).

Figure 7:
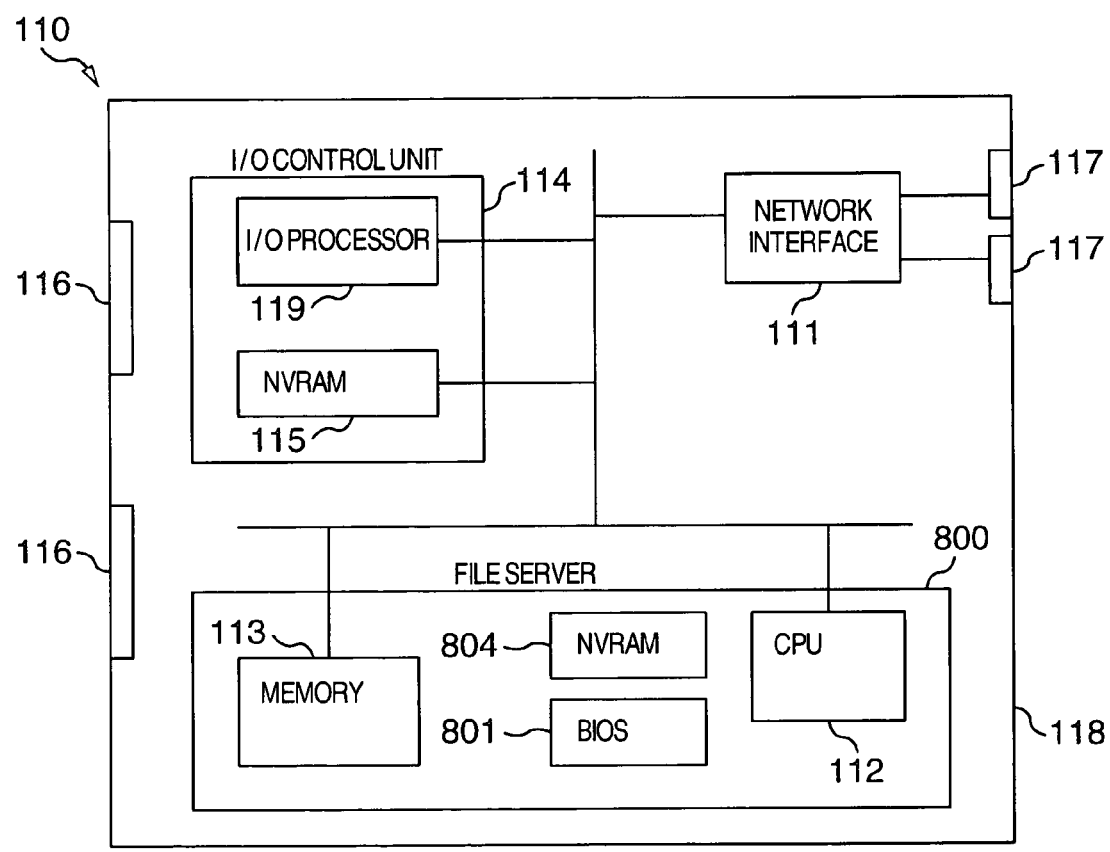
FIG. 7 is a block diagram showing a hardware configuration of a CHN according to an embodiment of the present invention.

The hardware arrangement of the CHN 110 is shown in FIG. 7. As shown, the CHN 110 is composed as one unit. This unit will be referred to as an NAS board. The NAS board is composed to have one or more circuit boards. In particular, the NAS board includes a network interface unit 111, an I/O control unit 114, a board connector 116, a communication connector 117, and a file server 800, all of which are formed as one unit. Further, the I/O control unit 115 includes a NV RAM (Non-volatile RAM) 115 and an I/O processor 119.

The network interface 111 provides a communication interface for communicating data with the information processing apparatus 200. The CHN 110 receives a file access request transmitted from the information processing apparatus 200 according to the TCP/IP protocol. The communication connector 117 is a connector used for communicating data with the information processing apparatus 200. The CHN 110 is a connector to be connected with the LAN 400. For example, it corresponds with the Ethernet (trademark).

The file server 800 includes a CPU 112, a memory 113, a BIOS (Basic Input/Output System) 801, the NVRAM 804. The CPU 112 controls the CHN 110 to be served as the NAS board. The CPU 112 performs several processes such as control of a file shared protocol like the NFS or CIFS and the TCP/IP, analysis of the specified file access request, mutual conversion from the file data in the control information stored in the memory 113 to the LU in the storage device 300 through the conversion table (not shown) in the LU inside the storage device 300, generation of a data write or a read request to or from the LU inside the storage device 300, transmission of a data write or read request to the I/O processor 119, and the like. The BIOS 801 is the software to be loaded to the memory 113 in the process of starting the CPU 112 when the CHN 110 is turned on. For example, the BIOS 801 is saved in a non-volatile medium such as a flash memory mounted on the CHN 110. The CPU 112 enables to initialize and diagnose the portion relevant to the CPU 112 located on the CHN 21 by executing the software read onto the memory 113. Further, the CPU 112 enables to read a predetermined program such as an OS booting portion from the storage device 300 into the memory 113 by issuing an indication such as a command from the BIOS 801 to the I/O processor 119. The read OS booting portion is served to read the essential portion of the OS saved in the storage device 300 in the memory 113, which causes the OS to be started on the CPU 112. For example, this makes it possible to execute a process as a file server. Further, the file server 800 includes a NVRAM 804 mounted therein, the NVRAM 804 saving a network boot loader according to the regulations such as PXE (Preboot execution Environment). This also makes it possible to execute the network boot to be discussed below.

The memory 113 stores various kinds of program and data. For example, the memory 113 stores metadata 730, a lock table 720 shown in FIG. 8 or various kinds of programs such as the NAS manager 706 shown in FIG. 14. The metadata 730 is the information generated in correspondence with the file managed by the file system. The metadata 730 includes information used for specifying a saving location of the file such as an address and a data size on the LU where the file data is stored. Moreover, the metadata 730 also includes the information such as a file volume, an owner, and an update time. Further, the metadata 730 may be generated in correspondence with not only the file but the directory. The metadata 730 is exemplarily shown in FIG. 9. The metadata 730 is stored in each LU on the storage device 300.

The lock table 720 is a table used for executing exclusive control of a file access to be given from the information processing apparatuses 1 to 3 (200). The exclusive control allows the information processing apparatuses 1 to 3 (200) to share a file. The lock table 720 is shown in FIGS. 10A and B. As shown, the lock table 720 is composed of a file lock table 721 and a LU lock table 722. The file lock table 721 is a table for indicating whether or not each file is locked. If a certain file is opened by any one of the information processing apparatus 200, the file is locked. The access to the locked file is disabled by the other information processing apparatuses 200. The LU lock table 722 is a table for indicating whether or not each LU is locked. If a certain LU is accessed by any one of the information processing apparatuses 200, the LU is locked. The access to the locked LU is disabled by the other information processing apparatuses 200.

The I/O control unit 114 transfers data or commands among the disk control unit 140, the cache memory 130, the shared memory 120, and the management terminal 160. The I/O control unit 114 provides the I/O processor 119 and the NVRAM 115. The I/O processor 119 is composed of a one-chip microcomputer, for example. The I/O processor 119 controls the request of writing data to or reading data from the LU in the storage device 300 and the transfer of the data and relays the communication between the CPU 112 and the disk control unit 140. The NVRAM 115 is a nonvolatile memory for saving a program of controlling the I/O processor 119. The content of the program stored in the NVRAM 115 may be written or rewritten in response to an indication given from the NAS manager 706 to be discussed below.

Figure 11:
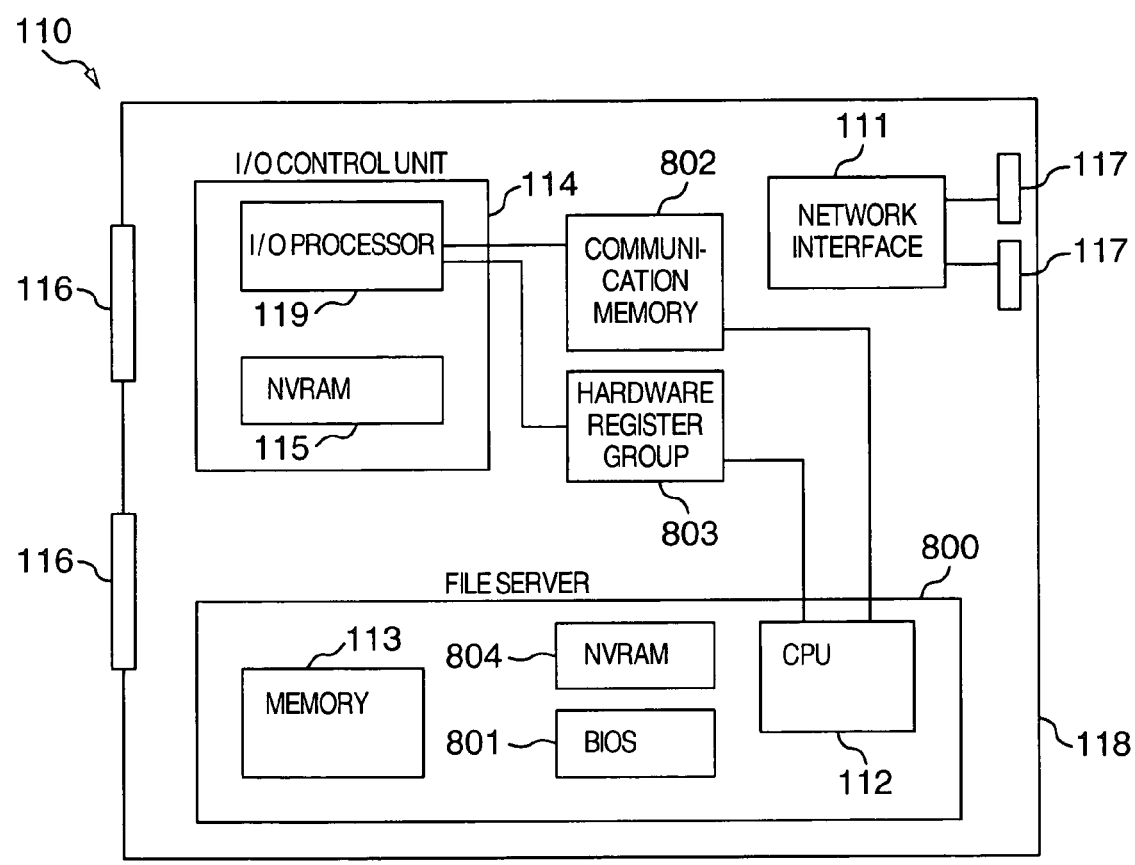
FIG. 11 is a block diagram showing a communication path between a CPU and an I/O processor on the CHN according to an embodiment of the present invention.

FIG. 11 concretely shows a communication path between the CPU 112 and the I/O processor 119 on the CHN 110. The I/O processor 119 is physically connected with the CPU 112 through a communication 802 and a hardware register group 803 mounted on the CHN 110. The communication memory 802 and the hardware register group 803 may be accessed from any one of the CPU 112 and the I/O processor 119. The hardware register group 803 is connected with the circuit for powering on and off the CPU 112. This allows the I/O processor 119 to handle the power supply of the CPU 112 through the hardware register 803 by accessing to the hardware register group 803. For example, the hardware register group 803 includes a function of generating an interrupt signal to a destination to be accessed if necessary and thereby notifying the destination of the access when the CPU 112 or the I/O processor 119 accesses the hardware register group 803. The hardware register group 803 also have some other functions. These functions are allocated to each register of the hardware register group 803 on the hardware basis.

Figure 12:
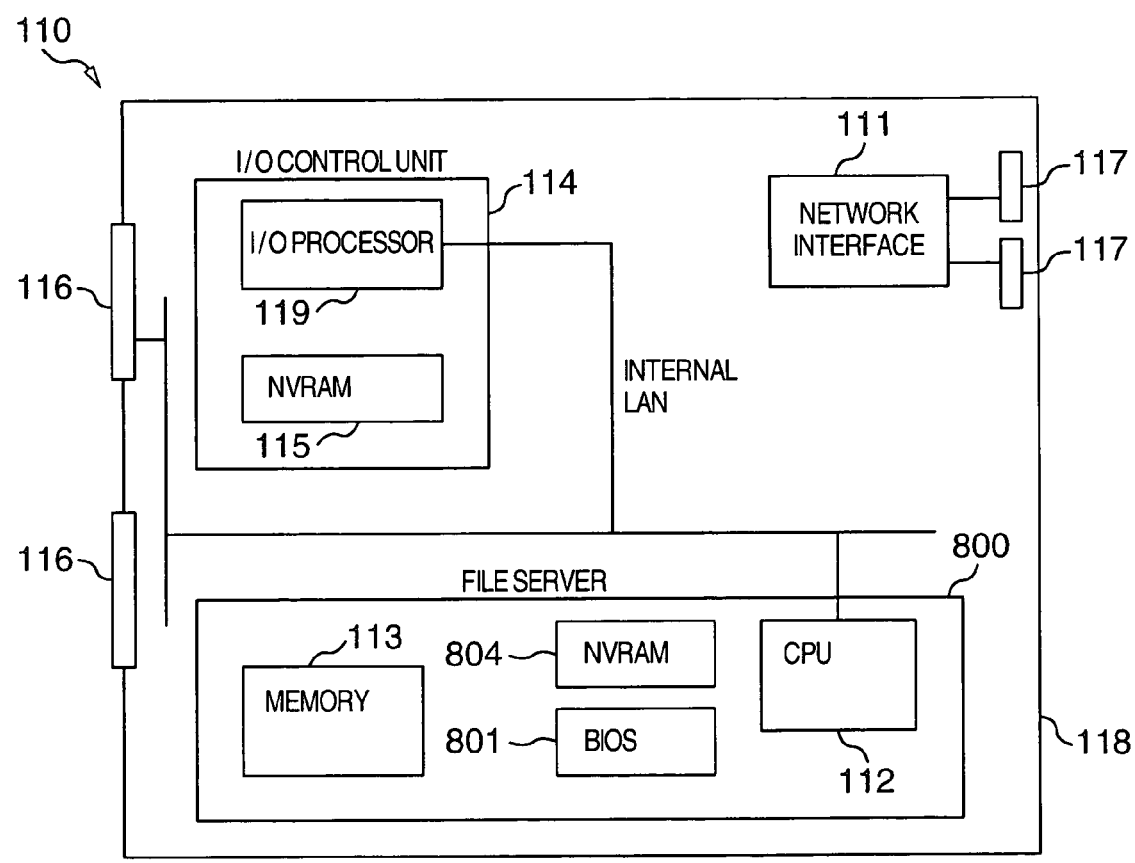
FIG. 12 is a block diagram showing a hardware configuration connected through an internal LAN in the CHN according to an embodiment of the present invention.

FIG. 12 is a block diagram of the hardware of connecting the CPU 112 with the I/O processor 119 through the internal LAN 151. As shown, the CPU 112 is also connected with the I/O processor 119 through the internal LAN 151, through which they may communicate with the management terminal 160. This allows the CPU 112 to download the starting software from the management terminal 160 to the memory 113 by executing the network boot loader pre-stored in the NVRAM 804, thereby executing the starting software. For example, this also makes it possible to execute the network boot process in which the management terminal 160 is served as a server and the CPU 112 is served as a client. The network boot is the method of starting and executing an OS boot image existing in the management terminal 160 on the LAN by the network boot loader on the client and the server on the management terminal 160 that operates to combine several protocols such as IP protocol, DHCP, TFTP and FTP with each other.

Figure 13:
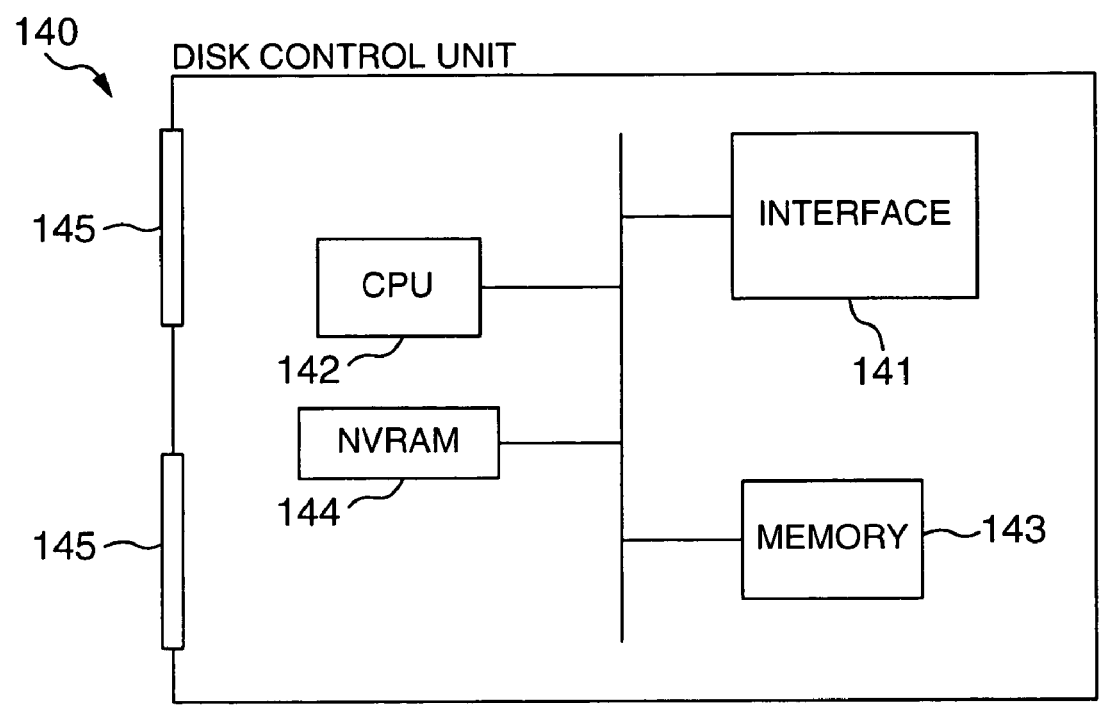
FIG. 13 is a block diagram showing a disk control unit according to an embodiment of the present invention.

FIG. 13 is a block diagram showing a hardware arrangement of the disk control unit 140. As mentioned above, the disk control unit is connected with the storage device 300 and also the CHN 112 through the connection unit 150. In this connection, the disk control unit 140 reads or writes data from or to the storage device 300 by itself or under the control of the CHN 112.

The disk control unit 140 provides an interface 141, a memory 143, a CPU 142, an NVRAM 144, and a board connector 145, all of which are integrally formed as a unit.

The interface 141 provides a communication interface for communicating data with the channel control unit 110 or the like, another communication interface for communicating data with the storage device 300, and the other communication interface for communicating data with the management terminal 160 through the internal LAN 151.

The CPU 142 totally controls the disk control unit 140 and communicates data with the channel control unit 110, the storage device 300, and the management terminal 160. By executing various kinds of programs stored in the memory 143 and the NVRAM 144, the functions of the disk control unit 140 according to this embodiment are realized. The functions to be realized by the disk control unit 140 include control of the storage device 300, RAID control, duplicating management of data stored in the storage device 300, backup control, remote copying control, and so forth.

The NVRAM 144 is a non-volatile memory for storing the program for controlling the CPU 142. The content of the program stored in the NVRAM 144 may be written or rewritten in response to an indication given from the management terminal 160 or the NAS manager 706.

The disk control unit 140 provides a board connector 145. The board connector 145 is connected with a connector located on the storage device control device 100. This results in electrically connecting the NAS manager 706 with the storage device control device 100.

(Software Configuration)

Figure 14:
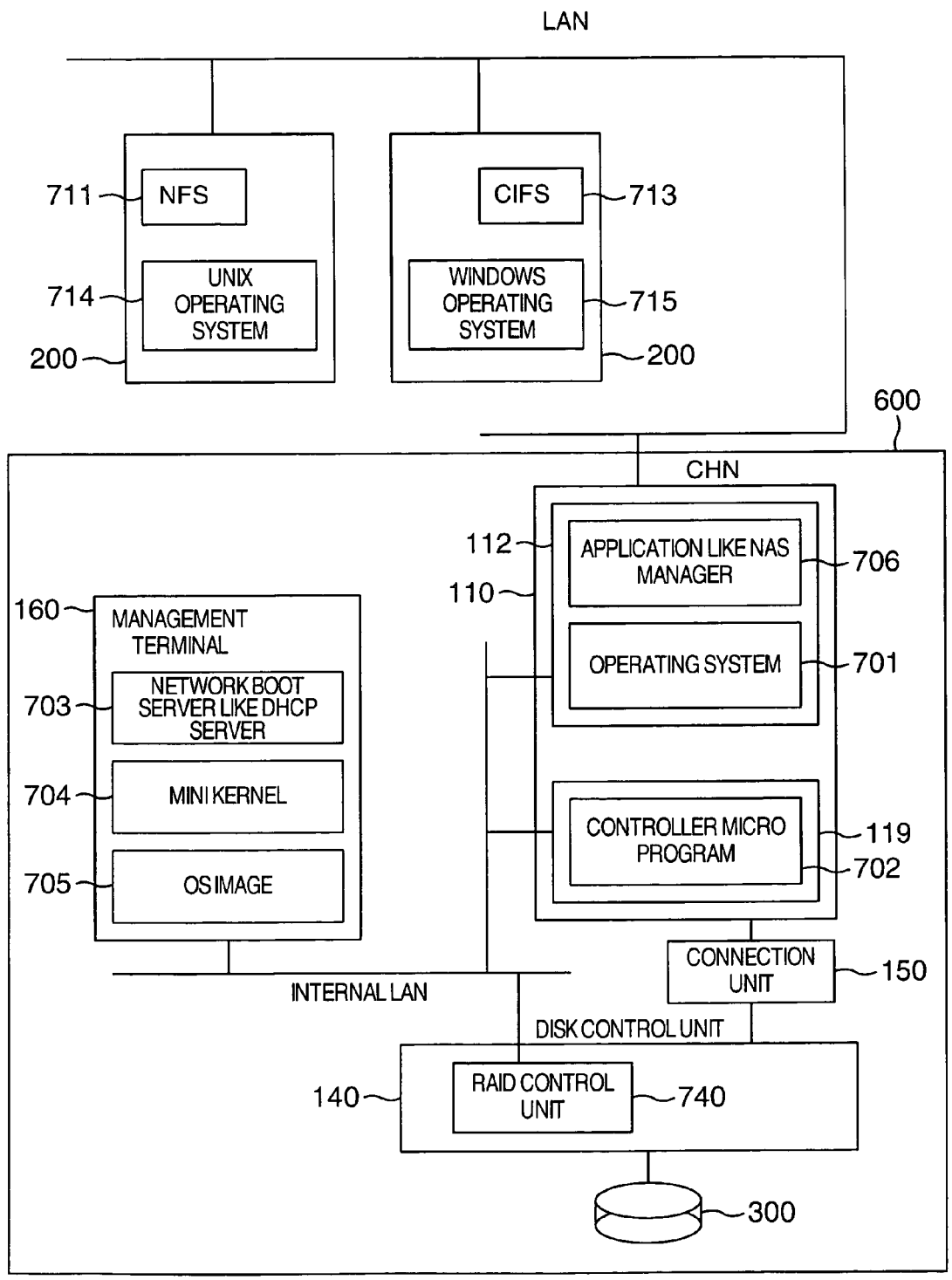
FIG. 14 is a block diagram showing a software composition included in the storage device system according to an embodiment of the present invention.

FIG. 14 is a diagram showing the configuration of the software loaded in the storage device system 600 according to this embodiment. As mentioned above, the CPU 112 and the I/O processor 19 are located on the CHN 110. The number of the CPU 112 or the I/O processor 119 may be single or plural. On the CPU 112, various kinds of applications such as an OS 701 and a NAS manager 706 are executed so that the CPU 112 may be served as the NAS server. On the I/O processor 119, the micro program is operated as a controller. In the disk control unit 140, the RAID control unit 740 is operated on the CPU 142. On the management terminal 160, the CPU 161 is served as a net boot server 703. The net boot server 703 transfers a mini kernel 704, an OS image 705, and the like to the CPU 112 located on the CHN 110 from the storage medium 167 or the storage device 168 through the internal LAN 151. The net boot server 703 includes a HDCP (Dynamic Host Configuration Protocol) server, for example. By allocating an IP address or a MAC address to the CPU 112, the CPU 161 and the I/O processor 119, the data transfer among the management terminal 160, the CPU 112, the CPU 161 and the I/O processor 119 is executed. To boot the net, for example, as a client, the CPU 112 requests the DHCP, the file transfer, and the like from the net boot server 703. The CPU 112 operates the mini kernel 704 on the CPU 112 in the process of the net boot. Lastly, the CPU 112 installs the OS image 705 into the storage device 300 through the I/O processor 119.

FIG. 14 also illustrates the software configuration of the information processing apparatus 200. The information processing apparatus 200 is divided into two types, one including the NFS (Network File System) 711 and the other including the CIFS (Common Internet File System) 713. The NFS 711 is a file-sharing protocol mainly used for the UNIX (trademark) system operating system 714. The CIFS 713 is a file-sharing protocol mainly used by the Windows (trademark) system OS 715.

(System Area of Storage Device System)

Figure 15:
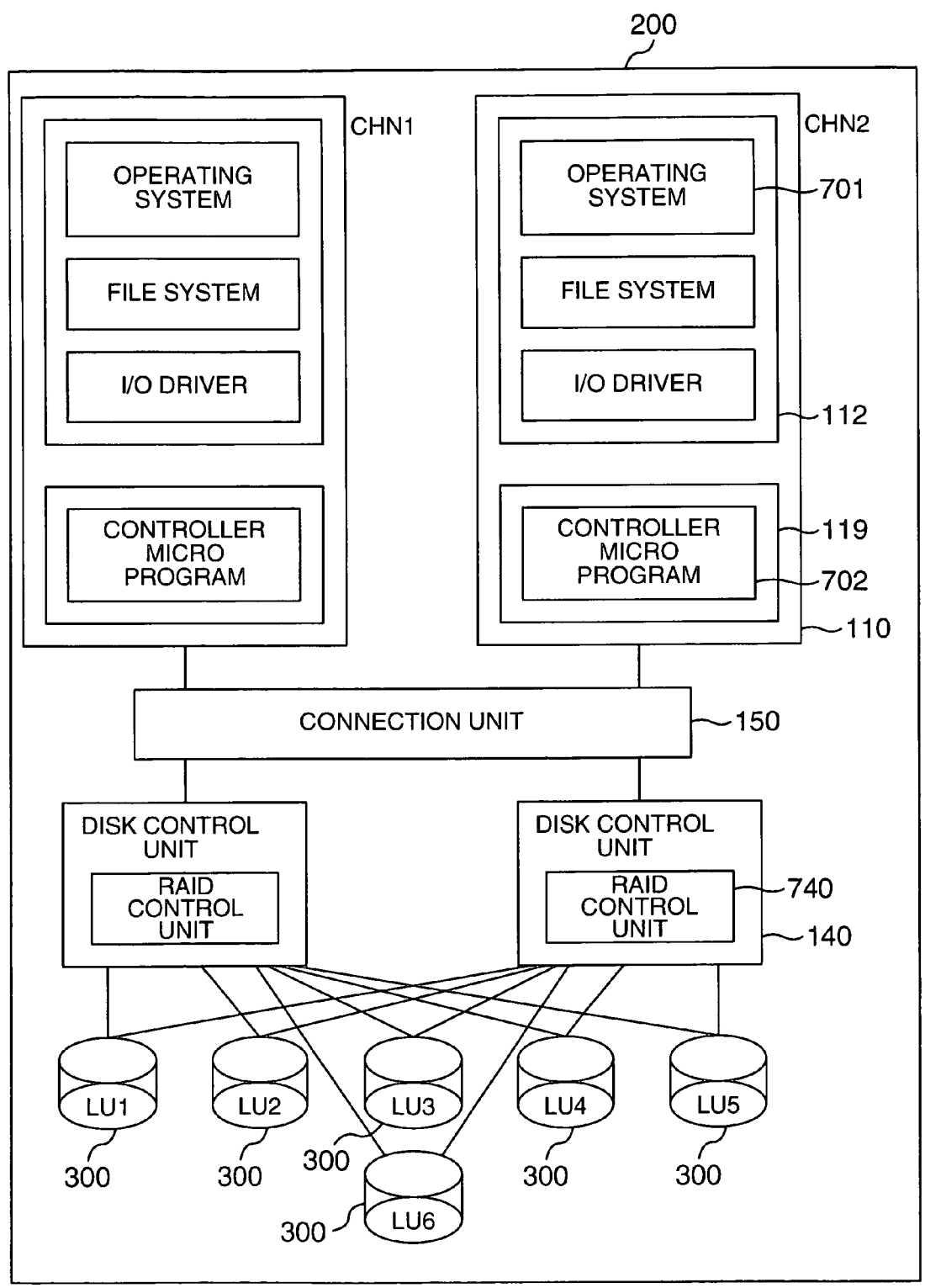
FIG. 15 is a block diagram showing a logic composition of an operating system LU or a shared LU according to an embodiment of the present invention.

FIG. 15 shows a storage area of software and information located inside the information processing apparatus 200. The software of the CPU 112 is stored in the storage device 300 by means of the network installing operation. Herein, the storage device is represented by the LU (Logical Unit) 1 to the LU 6. Herein, it is assumed that the software of the CPU 112 in the CHN 1 is stored in the LU 1 and the software of the CPU 112 in the CHN 2 is stored in the LU 4. The LU 2 is reserved as the information storage area of the CHN 1. The LU 5 is reserved as the information storage area of the CHN 2. The LU 3 is a shared LU for storing information required so that the software of the CPU 112 in the CHN 1 and the software of the CPU 112 in the CHN 2 may be operated in association with each other. The LU 6 is a backup LU for the shared LU, which is used for backing up the information of the LU 3.

The I/O processor enables to transfer data from the shared LU to the shared LU backup LU in response to an indication given from the CPU 112 or the management terminal 160. Further, the disk control unit 140 enables to transfer data from the shared LU to the shared LU backup LU by itself.

If the LU 3 is not available when the fail-over operation or the like is started between the CHN 1 and the CHN 2 through the use of the information of the LU 3, the use of the information of the LU 6 in place of the information of the LU makes it possible to continue the fail-over operation without any problem.

Further, the I/O processor 119 enables to back up the software of the CPU 112 from the information storage area of one CHN to that of another CHN, concretely, from the LU 1 to the LU 4 or from the LU 5 to the LU2. If the software storage area of the CPU 112 in the CHN 1 is not available, after the LU 1 is replaced by a maintenance person, the software may be restored from the LU 4 in response to an indication given from the CPU of the CHN though the CHN1 is returned into the software-uninstalled state.

(Data Access System of the Storage Device System)

In general, as viewed from the operating system, the system of accessing the data on the storage device is divided into two types, one access type using a file system, while the other access type using no file system. The operating system has another capability of accessing the data without using the file system by means of the method called a system call. The access that does not use any file system is executed to directly specify a data position. Consider the case that the data position on the storage device is directly specified in accessing the data. Unless any special process is executed, no exclusive control is executed if a plurality of operating systems make access to the same data position at a time. Hence, it is necessary to execute the exclusive control among the operating systems, among a plurality of controller micro programs, or among a plurality of disk control units through the effect of any means.

The file system is a commonly used term that indicates a system of managing data on the storage device, software for managing data on the storage device, or management information of data on the storage device. Ordinarily, the operating system uses the file system for accessing data. The software of the file system is normally mounted with the exclusive control function of the data. Hence, if a plurality of operating systems make access to the data on the same area of the storage device at a time, the exclusive controls of one to the other file systems are caused to maintain the data. In the case of managing the data through the use of the file system, it is necessary to define the file system for the area on the storage device, register the defined file system as the information of managing the operating system, and then request to access the file system. In general, the definition of the file system is called "creation of the file system". The registration of the file system is called "mount of the file system". The file system enables to perform or cancel the mount on any timing in response to an indication given from the operating system. The cancellation of the mount is called "unmount".

Ordinarily, the component of directly indicating an operation such as I/O to a controller program is an I/O driver that is operated by the CPU. The operating system commonly uses the file system software for requesting the I/O driver to issue an instruction to the controller micro program. In this case, the access is the file system access, in which the file system manages the exclusive control and the physical storage location of the data. Further, the operating system enables to directly request the I/O driver to issue an instruction to the controller micro program without having to use the file system software. In this case, since the file system that manages the data location and the exclusive operation is not used, the operating system is required to manage the data location by any means and execute the exclusive control by itself. In any case, viewed from the controller micro program, the request with the data location and the transfer size specified is issued from the I/O driver. This means that the controller micro program disables to determine whether or not the request from the CPU uses the file system.

(CHN Operating System)

In this storage device, for guaranteeing high availability, one combination of CHNs may be operated as complementing them with each other. The unit of the operation created by the combination of these CHNs is called a cluster. The CHNs belonging to a cluster share a path to the LU that stores the user data and thereby keeps accessing to a proper LU even if a user causes a client to issue a request to any one of the CHNs. However, the definition of the path is the information recognized by the controller micro program of the storage device system. Hence, for accessing the concerned LU, the operating system is ordinarily required to use the file system and execute the mount. If no path is defined, the controller micro program disables to convey the existence of the concerned LU to the operating system. Hence, no mount is executed. If the path is defined, when the operating system gives an inquiry to the controller micro program, the controller micro program enables to convey the existence of the concerned LU to the operating system. That is, for allowing the operating system to access the concerned LU, at first, when the operating system gives an inquiry about an available device to the controller micro program, the controller micro program is required to define the access path to the concerned LU and report the existence of the concerned LU. Secondly, the operating system creates the file system for one, as a minimum, or all, as a maximum, of all devices reported to be available so that the created file system may be mounted. Herein, the creation of the file system means that the operating system defines the structure of a file or a directory, the rules of accessing the structure, and stores the structures and the rules in both the system area and the data area so that the operating system specifies a file name and a directory name to the concerned device for the purpose of accessing the data. In this system the system area is located in the system LU and the data area is located inside the user LU. The operating system handles the file and the directory structure according to the rules and thereby reaches the target data. This accessing system is called a file system access.

(Data Access Method for Storage Device of Storage Device System)

Figure 16:
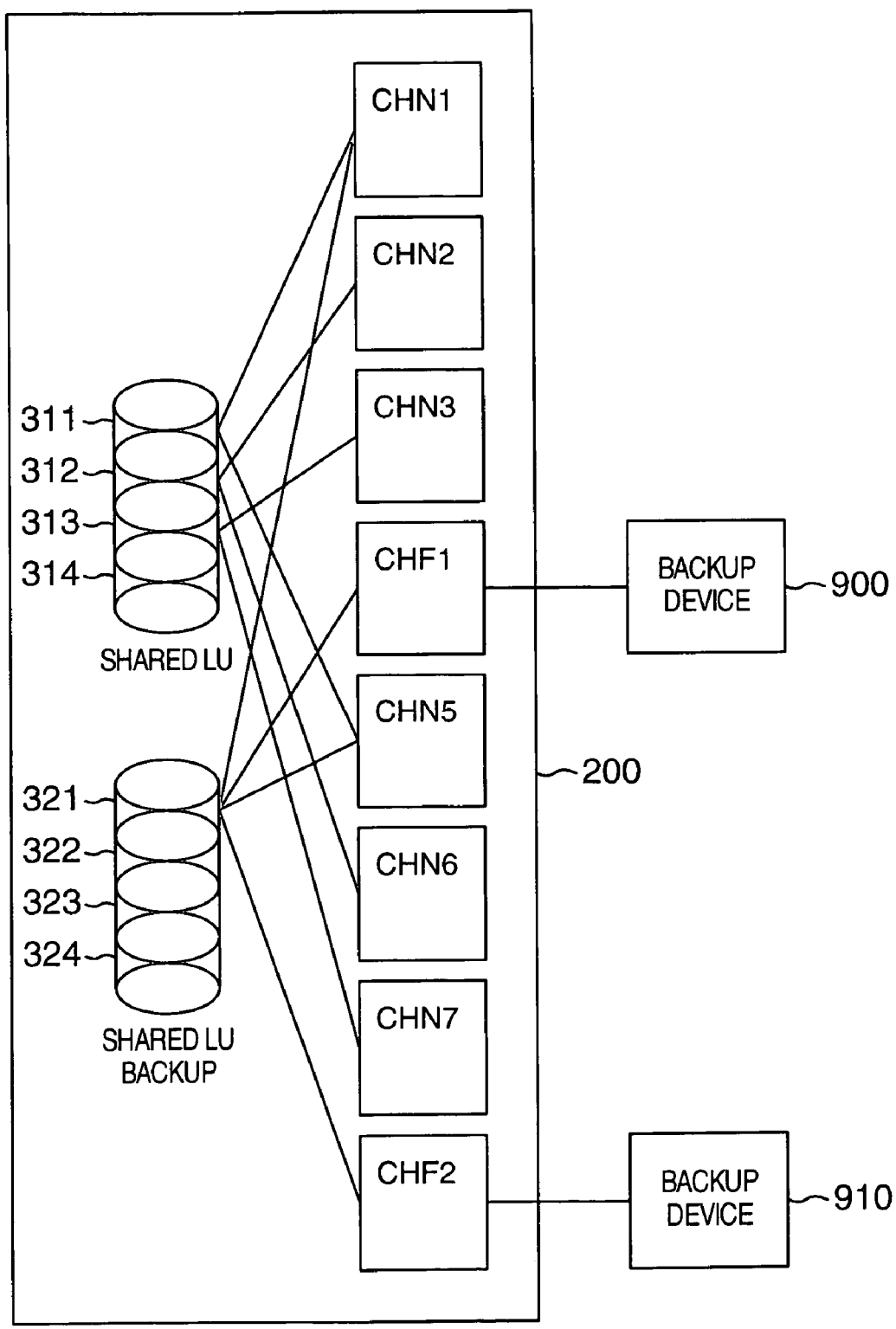
FIG. 16 is a view showing a logic composition in the case of backing up the shared LU according to the embodiment of the present invention as dividing it in partitions.

FIG. 16 is a logical block diagram in which the shared LU in the information processing apparatus is divided into a plurality of partitions and each partition is duplicated.

The shared LU is divided into four partitions. The shared LU backup LU with the same volume is also divided into four partitions each of which has the same volume. The user causes the management terminal 160 to initialize the shared LU and the shared LU backup LU when installing the operating system in the CHN.

(Backup LU of Storage Device System)

The procedure of backing up the shared LU will be described with reference to the backup of the partition of the shared LU commonly used by the CHNs 1 to 5. The shared LU is divided into four partitions of the shared LUs 311 to 314. The division of the partition is executed by defining the operating system. It is valid only by the access from the operating system. The paths of the shared LUs 311 to 314 and the shared LU backups 321 to 324 are defined from the CHNs 1 to 5, respectively. This means that the shared LUs 311 to 314 and the shared LU backups 321 to 324 may be accessed from the controller of the CHN 5. In this stage, the operating system of the CHN 1 or 5 issues a data block access indication to the controllers of the CHNs 1 and 5. This issuance means that the operation of reading or writing the data from or to the shared LUs 311 to 314 and the shared LU backups 321 to 324 is made possible. Further, when the operating system of the CHN 5 is caused to create the file systems to the shared LUs 311 to 314 and the shared LU backups 321 to 324, if the concerned file system is mounted from the CHN 1 or 5, the operating system enables to read or write the data from or to the shared LU backups 321 to 324 through the use of the file system. Herein, the read or the write of data through the use of the file system will be described. The CHNs 1 to 6 operate to define the location of the partition to be accessed from the location of the slot inserted to each CHN, respectively. The operating system determines the locations of the shared LUs 311 to 314 and the shared LU backups 321 to 324 to be accessed by the CHNs from the partition locations. In this example, it is determined that the CHNs 1 and 5 may access the shared LU 311 and the shared LU backup 321. The CHNs 1 and 5 do not access the shared LUs 312 to 314 and 322 to 324 as the operating system.

(Definition of Backup LU)

At first, each CHN has its own shared LUs 311 to 314. As to the shared LUs 311 to 314 and the shared LU backups 321 to 324, the access paths are pre-defined from the management terminal 160. If a plurality of CHNs are provided, as to all CHNs, the access paths to these shared LUs 311 to 314 and the shared LU backups 321 to 324 are pre-defined.

Then, when installing the NAS into the system at first, the operating system is installed from the management terminal 160 through the network on the first timing when the CHN is mounted. At this time, as part of the network installing work, the shared LUs 311 to 314 and the shared LU backups 321 to 324 are initialized by the install program. In this case, the shared LU is divided into the partitions of the shared LUs 311 to 324 and the shared LU backup is divided into the partitions of the shared LU backups 321 to 324. The information about the division is caused to be stored in the shared LU. After the work is completed, the operating system is installed into the LU therefor from the management terminal 160 through the network.

Later, when the CHN is mounted, the operating system LU corresponding with each CHN is initialized in sequence and the operating system is installed through the network. The shared LUs 311 to 314 and the shared LU backups 321 to 324 are not initialized since they have been once initialized.

(Way of Use of Shared LU)

The data stored in the shared LU 311 is the succeeded data in transferring a process from one CHN to another CHN. During the process, the CHN 1 stores in the shared LU 311 information such as an IP address of the CHN required for a client's access, client information, operating application information, processing information such as service on the operation system and an operating state of a daemon, and so forth. If the CHN 1 becomes unavailable by hardware or software failure, this unavailability is detected by the CHN 5 through the heart-beat function, the CHN 5 takes over the process being executed by the CHN 1 and then executes the process on the basis of the foregoing information stored in the shared LU 311. This allows a client who was accessing the CHN 1 to successively access the CHN 5 for continuing the process. This operation is called a fail-over.

(Necessity of Backup of Shared LU)

The shared LU 311 is ordinarily designed to keep its operation if a physical harddisk is failed through the effect of the RAID system. However, if the failure is so serious that it exceeds the redundancy prepared as the RAID, the shared LU 311 is made unavailable. In this case, further, if the CHN is failed, the CHN 5 disables to obtain the information used for taking over the process. Hence, the data stored in the shared LU 311 is required to be copied into the backup 321 of the shared LU 321.

(Backup System of Shared LU)

It is considered that the backup system of the shared LU may be a copy with a general-purpose command on the operating system. In this case, the command may be a command of copying data block by block on the device level and a command of copying data file by file with a file name specified. Users log in to the operating system from the client workstation or the personal computer existing on the network, and through the terminal software these commands will be executed. The user enters an instruction on the terminal so that the operating system may execute the command for the backup. If, for example, the operating system is UNIX (trademark), as these commands, the cp command for a file-by-file copy and the dd command for a block-by-block copy with a device specified are referred.

Further, in general, it is possible to set the operating system so that those command may be periodically executed. This allows the shared LU to be periodically backed up. Moreover, the specification given from the management terminal 160 makes it possible to copy all data of the shared LU into the shared LU backup through the use of the disk copy function included in the disk control unit 140 irrespective of the operating system or the controller micro program of the CHN. Further, the CHN 1 writes the shared data in the shared LU 311 and the shared LU backup 321 at a time without executing the copy on the opportunity of the indication. This causes the CHN 5 to execute the fail-over operation through the use of the remaining information even if the shared LU 311 or the shared LU backup 321 is not made available.

(Use of Backup Data)

The process of using the backed-up data will be described below.

If a failure takes place in the shared LU 311 so that the operation like the fail-over cannot be executed, the fact is reported to the maintenance person or the system manager through the use of a notifying function equipped with the storage device system. The maintenance person or the manager mounts the file system existing on the shared LU backup 321 from the management terminal. Afterwards, the normal process is executed. If the fail-over is required, the information on the shared LU backup 321 is used. Then, the maintenance person exchanges the drive in which a failure takes place. If a new shared LU 311 is prepared, the drive is initialized again and the data is reversibly copied from the shared LU backup 321 to the shared LU 311 through the use of the same means as that for creating the backup.

(Stored Destination of Backup Data)

In the foregoing embodiment, the backup data was created in another LU located inside the same storage device. In place, the data may be backed up from the external tape drive to be accessed from the operating system through the use of the NDMP protocol. Further, the data may be backed up to the backup device on the SAN through the CHF 1. Moreover, the data is also copied to another storage device through the use of a remote copy function provided in the storage device.

Next, these processes will be described with reference to the drawings.

FIG. 17 illustrates the process of initializing the shared LU, installing the operating system into the system LU, and creating a partition when introducing the NAS into the system. FIG. 18 shows the process to be executed when the CHN executes the fail-over. FIG. 19 shows the process of backing up data of the shared LU and causing the CHN to execute the fail-over operation through the use of the information of the shared LU backup if the shared LU is not made available.

At first, the description will be oriented to FIG. 17. The sequence numbers 1 to 8 in FIG. 17 concern the process of defining the path so that the shared LU and the shared LU backup may be recognized as a system from the CHNs 1 to 5. Then, the sequence numbers 9 to 24 shown in FIG. 17 concern the process of initializing the shared LU and the shared LU backup with the install software as installing the operating system in the system LU.

The system manager or the maintenance person indicates the initialization of the shared LU on the logical level from the management terminal 160 (FIG. 17— sequence number 1). This causes the shared LU to be logically initialized as a disk array (FIG. 17—sequence number 2). In this state, if the path is defined, the shared LU may be read or written by the I/O processor 119. However, the shared LU is not still recognized by the operating system. Then, the system manager or the maintenance person indicates the initialization of the shared LU backup on the logical level on the management terminal 160 (FIG. 17—sequence number 3). This causes the shared LU backup to be logically initialized as a disk array. Afterwards, the system manager or the maintenance person indicates definition of a path from the management terminal 160 to the shared LU (FIG. 17—sequence number 5). This allows the CHNs 1 and 5 to be associated with the shared LU so that the I/O processor 119 belonging to the CHNs 1 and 5 may access the shared LU (FIG. 17—sequence number 6). Further, the system manager or the maintenance person indicates definition of a path to the shared LU backup from the management terminal 160 (FIG. 17—sequence number 7). This allows the I/O processor 119 belonging to the CHNs 1 and 5 to access the shared LU backup (FIG. 17—sequence number 8). Then, the system manager indicates the install of the operating system.

At first, the system manager or the maintenance person causes the management terminal 160 to issue an indication so that the operating system may be installed into the CHN 1 (FIG. 17—sequence number 9). This is the start of installing the operating system of the CHN 1 (FIG. 17—sequence number 10). The install software is loaded on the CPU 112 and then is started to be operated. If the install software detects that no other CHN exists and this install operation is the first time in this system, the shared LU is initialized on the operating system level so that the shared LU may be used in the operating system (FIG. 17—sequence number 11). In actual, this initializing indication is executed through the I/O processor 119. Further, if the use of the predetermined portion of the shared LU is predetermined for each cluster in light of the software, the install software is executed to divide the area of the shared LU for allocating the predetermined area of the shared LU to each cluster. This process is called creation of the partition (FIG. 17—sequence number 11). This causes the shared LU to be initialized so that the shared LU may be accessed not only from the I/O processor but from the operating system. And, the operating system belonging to each cluster is divided into partitions so that it may access its own area (FIG. 17—sequence number 12). Likewise, the install software is executed to indicate the initialization and the partition division on the operating system level as to the shared LU backup (FIG. 17—sequence number 13). The shared LU backup is initialized to be accessed by the operating system belonging to each cluster and then is divided into partitions (FIG. 17—sequence number 14).

In succession, the install software is executed to create the file system for the predetermined area of the shared LU (FIG. 17—sequence number 15). The file system is used by both the CHNs 1 and 5. Hence, once the file system is created on the CHN 1, the file system is not required to be created again from the CHN 5. This process results in creating the information to be accessed as a file system by the operating system (FIG. 17—sequence number 16). Likewise, the install software is executed to create the file system on the shared LU backup. On the shared LU backup is created the information to be accessed as the file system by the operating system from the CHNs 1 and 5 (FIG. 17—sequence number 18).

Afterwards, the install software is executed to install the operating system for the LU area in which the operating system of the CHN 1 is stored. Upon completion of it, the install software notifies the management terminal of the install of the operating system to the CHN 1 (FIG. 17—sequence number 19). When the notice of completion is received from the management terminal 160 (FIG. 17—sequence number 20), a message of the end is outputted onto the terminal screen. The system manager or the maintenance person checks this message and then indicates to install the operating system to the CHN 5 (FIG. 17—sequence number 21). In the CHN 5, the install software is executed to install the operating system through the network (FIG. 17—sequence number 22). However, herein, in the CHN 1, the operating system has been installed to the system. Hence, the shared LU and the shared LU backup are not initialized. The install software is executed to install the operating system for the LU area in which the operating system of the CHN 5 is stored. Upon completion of it, the install software notifies the management terminal of the completion of installing the operating system in the CHN 5 (FIG. 17—sequence number 23). When the management terminal 160 receives a notice of completion (FIG. 17—sequence number 24), a message of the end is outputted onto the terminal screen. This completes the install of the operating system into the system, the initialization of the shared LU and the shared LU backup, and the creation of the partition.

In this embodiment, the install software that is operating on the CHN 1 to which the operating system is installed at first is executed to initialize all partitions to be used by the other CHNs. In place, the CHN 1 initializes only the area to be used by the CHN 1, and the relevant area may be initialized on the timing when the operating system is installed on each CHN. Further, in this embodiment, the area of each CHN is arranged to correspond with each partition in the shared LU. In place, the shared LU may be individually allocated to each CHN, the path is defined for each shared LU from another CHN so that another CHN may access each shared LU. The CHNs may share the information in each shared LU.

In turn, the description will be oriented to FIG. 18.

FIG. 18 illustrates how the CHN 5 takes over the operation from the CHN 1 if the operating system of the CHN 1 is disabled.

Figure 8:
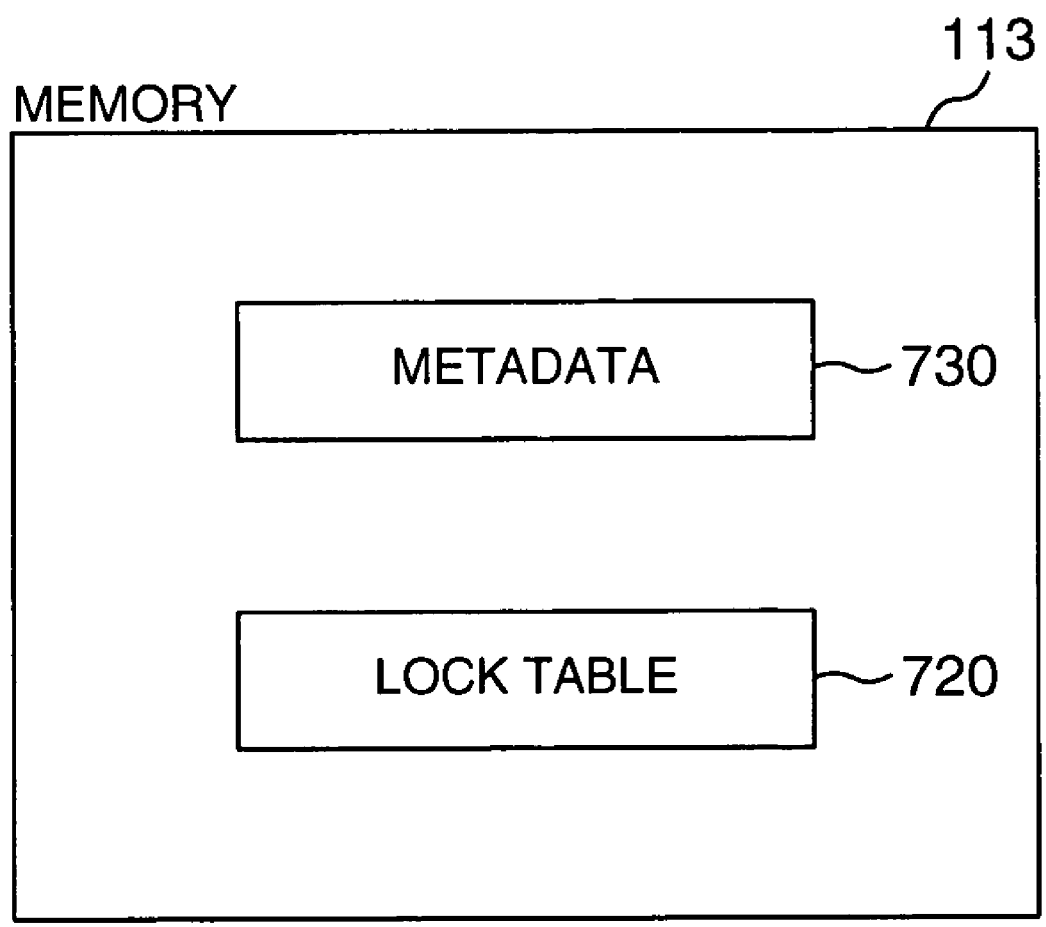
FIG. 8 is a view for explaining a content of data stored in the memory according to an embodiment of the present invention.

At first, in this process, the operating system of the CHN 5 is just required to be operated at any time until a failure takes place in the CHN 1 (FIG. 8—sequence number 10). In this embodiment, for simplifying the description, it is assumed that the operating system of the CHN 5 is being operated at a time before the explanation of the operation in the CHN 1 (FIG. 18—sequence number 1).

The operating system that is operating on the CHN 1 is caused to mount the file system of the shared LU to be used from the CHN 1 (FIG. 18—sequence number 2). This file system is created in FIG. 17—sequence number 15, for example. Upon completion of this mount, the operating system is caused to read and write data from and to the created file system (FIG. 18—sequence number 3). Afterwards, the operating system starts the process such as a file service to an ordinary client (FIG. 18—sequence number 4).

During the normal process, if the CHN 1 enters into the disable state of continuing the operation, the operating system of the CHN 1 is served to write the succeeding information in the shared LU so that the CHN 5 may take over the file service to the client and then restart the operation (FIG. 18—sequence number 5). In this embodiment, this write is executed by the file system. If the information is written not by the file system but by the block access, it is necessary to perform the exclusive process against the competitive write to be executed by another CHN. Further, the succeeding information includes information such as a client's IP address, user information of a system manager and general users, operating information of a service running on the operating system, daemon operating information, information as to which of the CHNs 1 and 5 may use the user LU, the shared LU and the file system, information as to the LU to be used by the file system, and information as to an IP address with which the CHNs 1 and 5 supplies the client. The succeeding information is written in the shared LU periodically or when the necessary information is changed by the operating system itself (FIG. 18—sequence number 7, FIG. 18—sequence number 9). Or, the user causes the management terminal 160 to write the succeeding information in the shared LU.

Apart from this, the operating system that is running on the CHN 5 periodically monitors whether or not the CHN 1 continues its operation (FIG. 18—sequence number 6, FIG. 18—sequence number 11).

Herein, it is assumed that a failure takes place in the CHN 1 and thereby the service to the client is interrupted (FIG. 18—sequence number 10). At a time, when the operating system that is running on the CHN 5 monitors the operation, the operating system detects that a failure takes place in the CHN 1 (FIG. 18—sequence number 12). Then, the operating system that is running on the CHN 5 is served to mount the file system on the shared LU by itself (FIG. 18—sequence number 13). Upon completion of the mount, the operating system of the CHN 5 enables to access the succeeding information that has been used by the operating system of the CHN 1. The operating system of the CHN 5 behaves like the CHN 1 as viewed from the client and restarts the service (FIG. 18—sequence number 15).

In the embodiment shown in FIG. 18, the fail-over operation has been executed by the CHN 1 served as a normal processing system and the CHN 5 served as a waiting system. This is the so-called active-standby operation system. In place, both the CHNs 1 and 5 may be served as the normal processing system, which is the so-called active-active operation system. In this case, when a failure takes place in one CHN, an individual file system is created for each CHN and the file system to be used by the other CHN may be mounted. Further, the information storage to the shared LU may take not a file-system form but a logical-address form and the data storage area may be allocated to each logical address in each CHN. In the case of the active-active operation system, the write of the succeeding information and the monitoring of the operating state of each CHN, both of which are shown in FIG. 18, are executed from one CHN to the other one or vice versa.

In turn, the description will be oriented to FIG. 19.

FIG. 19 illustrates the process of backing up the shared LU and executing the fail-over of the CHN through the use of the information of the shared LU backup if the shared LU is made unavailable.

Like FIG. 18, it is assumed that the CHN 5, served as taking over the process from the CHN 1 if a failure takes place in the CHN 1, starts the normal process at the outset (FIG. 19—sequence number 1). This file system is created in the sequence (FIG. 17—sequence number 15), for example. Upon completion of the mount, the operating system is allowed to read or write data from or to the file system (FIG. 19—sequence number 3). Then, the operating system starts the process such as a file service to the normal client (FIG. 19—sequence number 4).

During the normal process, if the CHN 1 falls into the disabled state, the operating system of the CHN 1 writes the succeeding information in the shared LU so that the CHN 5 may take over the file service to the client and restart the file service (FIG. 19—sequence number 5). This write is executed by the file system in this embodiment. If the write is executed by the block access without using the file system, it is necessary to execute the exclusive control against the competitive write from the other CHN. Further, the succeeding information includes information such as a client IP address, user information of a system manager or a general user, operating information of a service running on the operating system, daemon operating information, information as to whether of the CHNs 1 and 5 may use the file system, information as to the LU to be used by the file system, information as to the IP address supplied to the client by the CHNs 1 and 5, and so forth. This succeeding information is written in the shared LU periodically or when the necessary information is changed by itself. (FIG. 19—sequence number 7). Or, the user causes the management terminal 160 to write the succeeding information in the shared LU.

Apart from the above operation, the operating system running in the CHN 5 periodically monitors whether or not the CHN 1 is successively operating (FIG. 19—sequence number 6 and FIG. 19—sequence number 6).

The operating system of the CHN 1 is served to back up the area of the shared LU to be used by the CHNs 1 and 5 through the use of the copy command of the OS itself (FIG. 19—sequence number 8). For example, the UNIX operating system 714 or the Windows operating system 715 operating in the information processing apparatus 200 located in the LAN 400 logs in the operating system 702 running on the CPU 112 for the purpose of using the copy command generally supplied by the operating system 702. If the operating system 702 is UNIX, the copy command is a cp command. If the data is directly copied block by block by specifying the LU device without using the file system, the copy command is a dd command, for example. Further, the UNIX operating system 714 or the Windows operating system 715 operating in the information processing apparatus 200 located in the LAN 400 logs in the application 706 such as a NAS manager operating on the CPU 112 for the purpose of using the application function for copying. In place, the management terminal 160 is caused to log in these operating systems or applications for the purpose of executing the copying function. Or, the management terminal 160 is caused to issue an indication to the disk control unit 140 so that the disk control unit may perform the copying function by itself. Further, the controller micro program running on the I/O processor 119, the application such as a NAS manager running on the CPU 112, the operating system running on the CPU 112, and the RAID control unit 740 and the CPU 142 located on the disk control unit 140 monitor the state of the system. For example, when the proportion of the data transfer load to the system is lower than a predetermined value and thereby no remarkably adverse influence such as a lower performance is applied to the service to the client even if the copy is executed, these commands are automatically started and executed for backing up the data.

In this embodiment, the user logs in the operating system from the information processing terminal 200 for the purpose of using the cp command generally supplied by the operating system. This allows the area for the CHNs 1 and 5 on the shared LU to be copied to the corresponding area with the shared LU backup (FIG. 19—sequence number 9 and FIG. 19—sequence number 10).

Further, the backup may be created for not only the shared LU backups 321 to 324 but also the external backup device 900 and the external storage device system 610. Herein, there is disclosed a method of backing up the shared LU area for the CHNs 1 and 5 to the tape device 900 through the SAN according to the NDMP (Network Data Management Protocol) (FIG. 19—sequence number 11). This method makes it possible to back up the data onto the external backup device (FIG. 19—sequence number 12 and FIG. 19—sequence number 13). Further, in the case of backing up the information of the shared LU to the external storage device system 610, it is considered that the service to the client is taken over in the external storage device system 610 through the use of the information. In this case, not only the service to the client but the user data having being accessed by the client are required to be synchronized with the external storage device system 610 through the use of the remote copy function or the like.

Herein, assume that the shared LU is made unavailable by something like failure (FIG. 19—sequence number 14). At this time, though no special influence is applied to the file service to the client, if a failure takes place in the CHN 1 (FIG. 19—sequence number 15) and the fail-over operation is required, it is impossible to obtain the succeeding information from the CHN 5 as indicated in FIG. 18—sequence number 13. In actual, when the operating system running on the CHN 5 detects the failure in the CHN 1 (FIG. 19—sequence number 17), the operating system indicates to mount the file system of the shared LU (FIG. 19—sequence number 18). However, the mounting operation is failed because the shared LU is made unavailable (FIG. 19—sequence number 19). If the failure of mounting the shared LU is detected, the operating system of the CHN 5 indicates to mount the file system in the shared LU backup (FIG. 19—sequence number 20). This allows the operating system of the CHN 5 to read or write information from or to the file system included in the shared LU backup (FIG. 19—sequence number 21). Afterwards, the operating system of the CHN 5 enables to restart the service such as the file service of the CHN 1 to the client, based on the succeeding information of the shared LU backup (FIG. 19—sequence number 22).

Afterwards, if the shared LU is made available again by the exchange of the physical device, the shared LU is initialized again on the opportunity of the device exchange. The process of FIG. 19—sequence number 8 is executed from the backup of the shared LU to the shared LU, thereby being able to write back the succeeding information to the shared LU again.

The foregoing description has concerned with the embodiments. The foregoing embodiments are disclosed for easily understanding the present invention and thus do not define the present invention. The present invention may be changed and modified without departing the spirit and the scope of the invention and includes its equivalents.

This application relates to and claims priority from Japanese Patent Application No. 2003-394922 filed on Nov. 26, 2003 in Japan, the contents of which is incorporated herein by reference to support the present invention.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array system comprising:
a plurality of storage devices for storing data;
a storage device control unit for controlling to store data in said plurality of storage devices;
a connection unit being connected with said storage devices;
a plurality of first channel control units each having a first processor converting file data, receiving said file data sent from a host computer through an local area network, into block data and requiring to store said data in said plurality of storage devices and a second processor of transferring said block data to said plurality of storage devices through said connection unit and said storage device control unit in response to said request sent from said first processor, and said plurality of first channel control units being connected with said connection unit and said local area network;
a shared memory for storing control information to be transferred between said plurality of first channel control units and said storage device control unit; and
a cache memory for temporarily saving data to be transferred between said plurality of first channel control units and said storage device control unit,
wherein said second processor located in each said plurality of first channel control units divides a plurality of first storage areas and one or more second storage areas in said plurality of storage devices,
wherein said first storage areas are used to store said block data sent from a host computer,
wherein said second storage areas are used to store processor information regarding a processing state of each of said first processors to be transferred among said plurality of said first processors and one or more software programs which are executed by said first processors, and wherein said storage device control unit copies said processor information and said software programs stored in said second storage area into a backing up storage area.

2. A disk array system as claimed in claim 1, wherein said first processor located in each of said plurality of first channel control units indicates storage of information regarding the processing status of said first processor to said second processor located in said first channel control unit provided with said first processor, and said second processor located in said first channel control unit provided with said first processor controls storage of the information regarding the processing status of said first processor in said second storage area in response to an indication given from said first channel control unit.

3. A disk array system as claimed in claim 1, wherein said second processor located in each of said plurality of first channel control units saves said block data in said cache memory and stored information for representing saving of said block data in said cache memory in said shared memory in response to a request given from said first processor located in said first channel control unit provided with said second processor, and said shared memory is caused to store said information for representing saving of said block data in said cache memory under the control of said second processor located in each of said plurality of first channel control units.

4. A disk array system as claimed in claim 1, wherein said first processor located in each of said plurality of first channel control units indicates said storage device control unit to copy said information stored in said second storage area to the storage area for backing up said processor information, and said storage device control unit controls a copy process in response to an indication given from said first processor.

5. A disk array system as claimed in claim 4, wherein said first processor located in each of said plurality of first channel control units reads or writes the information stored in said storage area for backing up said processor information, thereby keeping the process if the read or the write of said information stored in said second storage area is disabled.

6. A disk array system as claimed in claim 1, wherein said plurality of first channel control units are classified into a plurality of cluster groups, said second storage area includes a plurality of processor information storage portions, and each different one of said plurality of processor information storage portion is allocated to the corresponding one of said plurality of cluster groups.

7. A disk array system as claimed in claim 6, wherein said plurality of first channel control units included in the first one of said plurality of cluster groups are caused to store information regarding the processing status between said first processors in the first one of said plurality of processor information storage portions, and said plurality of first channel control units included in the second one of said plurality of cluster groups are caused to store information regarding the processing status between said first processors in the second one of said plurality of processor information storage portions.

8. A disk array storage system as claimed in claim 7, wherein said first processor of each of said plurality of first channel control units included in said first cluster group indicates creation of duplication of information stored in said first processor information storage portion to said storage device control unit, and said storage device control unit is caused to store duplication of the information stored in said first processor information storage portion in a first backup area included in said storage area for backing up said processor information in response to an indication of said first processor of said plurality of first channel control units included in said first cluster group.

9. A disk array system as claimed in claim 7, wherein said first processor included in each of said plurality of first channel control units included in the first cluster group indicates creation of duplication of the information stored in said first processor information storage portion and said second processor information storage portion to said storage device control unit, and said storage device control unit is caused to store duplication of said information stored in said first processor information storage portion and said second processor information storage portion in a first backup area and a second backup area included in said storage area for backing up said processor information in response to an indication of said first processor of each of said first channel control units included in said first cluster group.

10. A disk array system as claimed in claim 7, further comprising a management terminal used for obtaining information regarding said plurality of first channel control units and said storage device control unit, and wherein said storage device control unit is caused to store duplication of information stored in said in said first processor information storage portion and said second processor information storage portion in a first and a second backup areas included in said storage area for backing up said processor information.

11. A disk array system as claimed in claim 8, wherein said first processor located in each of said plurality of first channel control units included in said first cluster group reads or writes information stored in said first backup area from or to said first backup area, thereby keeping the process if the read or the write of the information stored in said first processor information storage portion is disabled.

12. A disk away system as claimed in claim 1, wherein said software programs are OS (operation software) for said first processor.

* * * * *